US009643607B2

(12) United States Patent
Nagatsuka et al.

(10) Patent No.: US 9,643,607 B2

(45) Date of Patent: May 9, 2017

(54) VEHICLE MOTION CONTROL SYSTEM

(71) Applicant: HITACHI AUTOMOTIVE SYSTEMS, LTD., Hitachinaka-shi, Ibaraki (JP)

(72) Inventors: Keiichiro Nagatsuka, Hitachinaka (JP); Makoto Yamakado, Tokyo (JP); Mikio Ueyama, Hitachinaka (JP); Mitsuhide Sasaki, Hitachinaka (JP)

(73) Assignee: HITACHI AUTOMOTIVE SYSTEMS, LTD., Ibraraki (JP)

( * ) Notice: Subject to any disclaimer, the term of this patent is extended or adjusted under 35 U.S.C. 154(b) by 0 days.

(21) Appl. No.: 14/762,935

(22) PCT Filed: Dec. 20, 2013

(86) PCT No.: PCT/JP2013/084182

§ 371 (c)(1),
(2) Date: Jul. 23, 2015

(87) PCT Pub. No.: WO2014/119171

PCT Pub. Date: Aug. 7, 2014

(65) Prior Publication Data

US 2015/0367852 A1 Dec. 24, 2015

(30) Foreign Application Priority Data

Jan. 31, 2013 (JP) ................................. 2013-016335

(51) Int. Cl.
*B60W 30/18* (2012.01)
*B60T 8/17* (2006.01)
(Continued)

(52) U.S. Cl.
CPC ........... *B60W 30/18* (2013.01); *B60T 8/1766* (2013.01); *B60T 8/17555* (2013.01); *B60W 2520/105* (2013.01)

(58) Field of Classification Search
CPC .. B60T 8/17555; B60T 8/1766; B60W 30/18; B60W 2520/105
(Continued)

(56) References Cited

U.S. PATENT DOCUMENTS

2009/0112404 A1 4/2009 Imura et al.
2009/0192675 A1 7/2009 Yamakado et al.
(Continued)

FOREIGN PATENT DOCUMENTS

EP 2 060 464 A2 5/2009
JP 08-295216 A 11/1996
(Continued)

OTHER PUBLICATIONS

English translation of the Japanese Office Action issued on Jan. 6, 2017 in the Japanese Application No. 2013-016335.
(Continued)

*Primary Examiner* — Aaron L Troost
(74) *Attorney, Agent, or Firm* — Volpe and Koenig, P.C.

(57) ABSTRACT

Disclosed is a vehicle motion control system that can control a vehicle without making a driver feel uncomfortable. The vehicle motion control system includes a control command value calculation unit configured to calculate a control command value for controlling the longitudinal acceleration of a vehicle; a longitudinal acceleration estimating unit configured to estimate the longitudinal acceleration of the vehicle induced by a driver's brake operation; a longitudinal jark estimating unit configured to estimate the longitudinal jark of the vehicle by differentiating the longitudinal acceleration with respect to time; a deviation determination unit configured to determine a deviation between vehicle's motion induced by the driver's brake operation and vehicle's motion induced by a control command using the longitudinal jark and the control command value; and a control command value correction unit configured to correct the control command in accordance with a deviation determination result of the deviation determination unit.

14 Claims, 16 Drawing Sheets

(51) Int. Cl.
*B60T 8/1755* (2006.01)
*B60T 8/1766* (2006.01)

(58) Field of Classification Search
USPC ........................................................... 701/70
See application file for complete search history.

(56) References Cited

U.S. PATENT DOCUMENTS

| | | | |
|---|---|---|---|
| 2010/0292904 | A1 | 11/2010 | Taguchi et al. |
| 2012/0179349 | A1 | 7/2012 | Yamakado et al. |
| 2012/0277965 | A1 | 11/2012 | Takahashi et al. |
| 2014/0180554 | A1 | 6/2014 | Takahashi et al. |

FOREIGN PATENT DOCUMENTS

| | | | |
|---|---|---|---|
| JP | 2008-285066 | A | 11/2008 |
| JP | 2009-107447 | A | 5/2009 |
| JP | 2010-076584 | A | 4/2010 |
| WO | 2011/040115 | A1 | 4/2011 |
| WO | 2012/035401 | A1 | 3/2012 |
| WO | 2012/153367 | A1 | 11/2012 |

OTHER PUBLICATIONS

The Extended European Search Report issued on Nov. 18, 2016 in the EP Application No. 13874204.4.

VEHICLE MOTION CONTROL SYSTEM

TECHNICAL FIELD

The present invention relates to a vehicle motion control system that controls the longitudinal acceleration of a vehicle.

BACKGROUND ART

Typically, the following vehicle motion control systems, which control the longitudinal acceleration of a vehicle, are known.

One of the vehicle motion control systems is an adaptive cruise control (hereinafter, referred to as ACC) system, and this vehicle motion control system controls the longitudinal acceleration of a host vehicle such that a host vehicle speed is maintained at a pre-set vehicle speed, or the distance between the host vehicle and a vehicle travelling in front of the host vehicle is maintained at a predetermined distance without an accelerator pedal operation or a brake pedal operation performed by a driver.

Another vehicle motion control system is a pre-crash control system, and when a host vehicle cannot avoid collision with a target that approaches the host vehicle from the front, side, rear, or the like of the host vehicle, this vehicle motion control system takes measures to reduce the impact of collision by operating a brake pedal, or to reduce an impact on passengers by appropriately tightening seat belts, the impact being induced by collision.

In addition, PTL 1 discloses another type of motion control system that safely and pleasantly controls a vehicle like a skilled driver by controlling the longitudinal acceleration of the vehicle in accordance with the vehicle lateral jerk induced by a driver's operation. Typically, a motion control algorithm loaded onto the motion control system is referred to as G-vectoring control.

A technology is also known, by which a plurality of the aforementioned motion control systems can be integrated into a single system by combining a plurality of basic motion control algorithms together.

The vehicle motion control systems not only safely control a vehicle, but also pleasantly control the vehicle, assisting a driver in driving. In particular, it is important for the systems to perform control not to make a driver uncomfortable in that the systems are intended to perform pleasant control.

As a motion control system that performs control not to make a driver uncomfortable, PTL 2 discloses an acceleration and deceleration control system that controls the acceleration and deceleration of a host vehicle, corrects the longitudinal acceleration and deceleration of the host vehicle based on the vehicle lateral jerk of the host vehicle, and allows or prohibits the correction from being made to the longitudinal acceleration and deceleration of the host vehicle based on predetermined conditions.

CITATION LIST

Patent Literature

PTL 1: JP-A-2008-285066
PTL 2: JP-A-2010-76584

SUMMARY OF INVENTION

Technical Problem

The acceleration and deceleration control system disclosed in PTL 2 can better align host vehicle's motion with a driver's intention of accelerating and decelerating the host vehicle, and can reduce discomfort of the driver induced by acceleration and deceleration correction control.

That is, in the acceleration and deceleration control system, the "driver's intention of accelerating and decelerating the vehicle", which is associated with a driver's accelerator pedal operation, is mainly taken into consideration; however, a relationship between vehicle's motion induced by a driver's brake operation and vehicle's motion induced by a control command output from a motion control algorithm is not sufficiently taken into consideration.

An object of the invention is to provide a vehicle motion control system that can control a vehicle without making a driver uncomfortable.

Solution to Problem

In order to solve the problem, a vehicle motion control system according to the invention includes: a control command value calculation unit configured to calculate a control command value for controlling the longitudinal acceleration of a vehicle; a longitudinal acceleration estimating unit configured to estimate the longitudinal acceleration of the vehicle induced by a driver's brake operation; a longitudinal jerk estimating unit configured to estimate the longitudinal jerk of the vehicle by differentiating the longitudinal acceleration with respect to time; a deviation determination unit configured to determine a deviation between vehicle's motion induced by the driver's brake operation and vehicle's motion induced by a control command using the longitudinal jerk and the control command value; and a control command value correction unit configured to correct the control command in accordance with a deviation determination result of the deviation determination unit.

Advantageous Effects of Invention

The invention can provide a vehicle motion control system that can control a vehicle without making a driver uncomfortable.

DESCRIPTION OF EMBODIMENTS

Hereinafter, embodiments of a vehicle motion control system of the invention will be described with reference to the accompanying drawings.

(Vehicle Motion Control System in Embodiment 1)

A vehicle motion control system in Embodiment 1 of the invention is described with reference to FIGS. 1 to 8.

<Configuration of Motion Control System>

Figure 1:
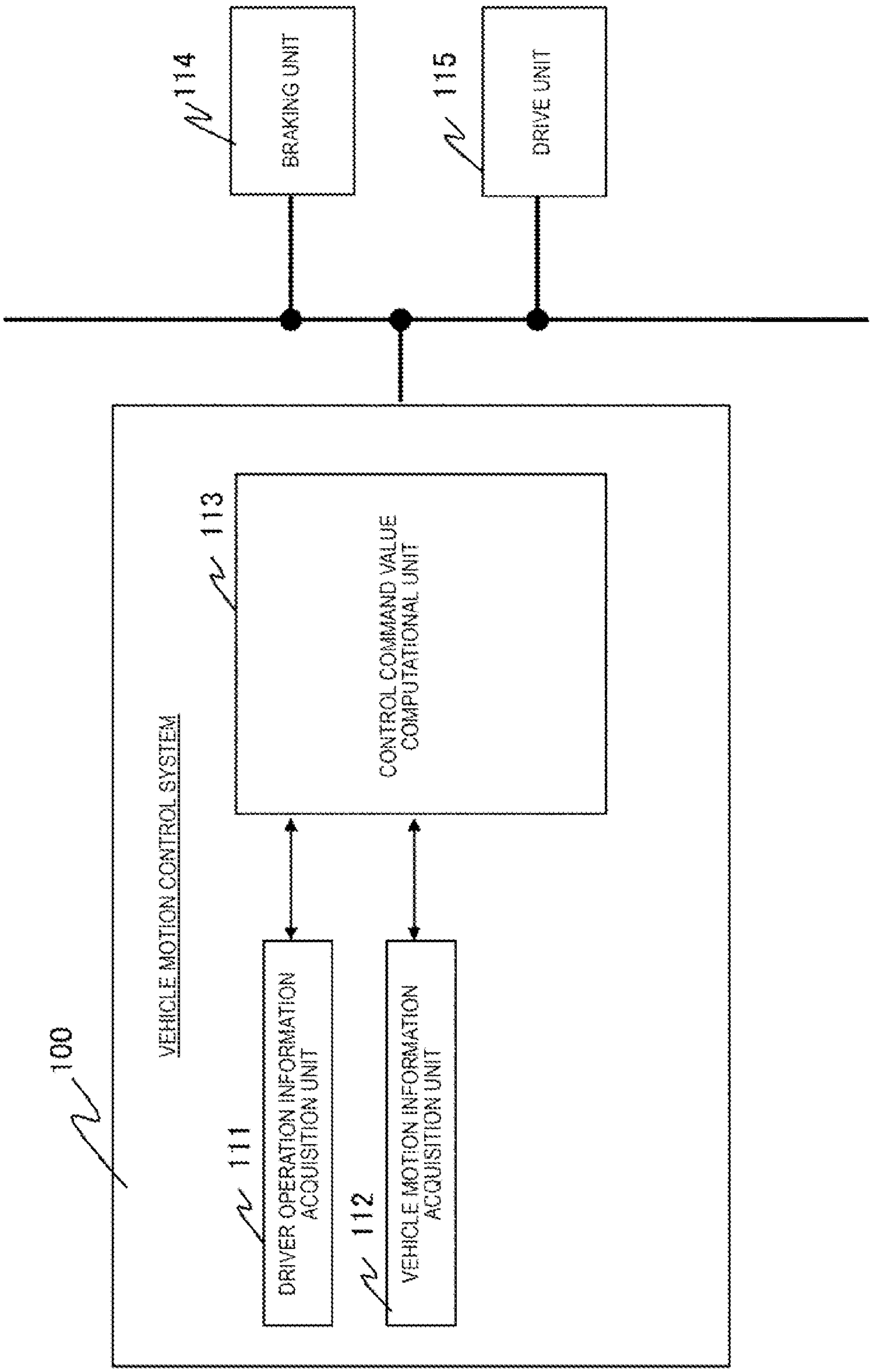
FIG. 1 is a block diagram of a vehicle motion control system according to Embodiment 1 of the invention.

FIG. 1 is a block diagram of the vehicle motion control system according to the embodiment. In FIG. 1, a vehicle motion control system 100 includes a driver operation information acquisition unit 111; a vehicle motion information acquisition unit 112; and a control command value computational unit 113.

A braking unit 114 applies the brakes of a vehicle, and a drive unit 115 drives the vehicle in accordance with a control command value computed by the vehicle motion control system 100.

The driver operation information acquisition unit 111 works to collect driver's operation information such as the amount of accelerator pedal depression, the amount of brake pedal depression, and a steering angle, and to transmit the driver's operation information to the control command value computational unit 113.

The vehicle motion information acquisition unit 112 works to collect vehicle's motion information such as a host vehicle speed, a yaw rate, longitudinal acceleration, and vehicle lateral acceleration, and to transmit the vehicle's motion information to the control command value computational unit 113.

It is sufficient that information required for each motion control algorithm is collected from the information which is transmitted to the control command value computational unit 113 from the driver operation information acquisition unit 111 and the vehicle motion information acquisition unit 112, and as necessary, it is also possible to add sensors and the like to the configuration.

The control command value computational unit 113 includes a read only memory (ROM) for storing a motion control algorithm; a central processing unit (CPU) that executes various computational processes; a random access memory (RAM) for storing computational results; and the like. Hereinafter, the internal configuration of the control command value computational unit 113 is described in detail with reference to FIG. 2.

The braking unit 114 works to brake the vehicle in accordance with a vehicle control command value (vehicle braking control command value) computed by the control command value computational unit 113. For example, the braking unit 114 is preferably a mechanism including a pump that discharges a high-pressure brake fluid, and magnetic valves that supply the brake fluid to wheel cylinders of wheels while adjusting the pressure of the brake fluid.

The drive unit 115 works to drive the vehicle in accordance with a vehicle control command value (vehicle driving control command value) computed by the control command value computational unit 113. Specifically, the drive unit 115 is preferably an engine system, an electric motor system, or the like which can change a driving force of the vehicle in accordance with the driving control command value.

When the electric motor system is used as the drive unit 115, it is also possible to regenerate a portion of the braking capacity of the braking unit 114.

In the embodiment, the vehicle motion control system 100, the braking unit 114, and the drive unit 115 are illustrated as separate blocks; however, for example, the vehicle motion control system 100 and the braking unit 114 of the vehicle can be assembled into a single system, the vehicle motion control system 100 and the drive unit 115 of the vehicle can be assembled into a single system, or all the vehicle motion control system 100, the braking unit 114, and the drive unit 115 of the vehicle can also be assembled into a single system.

In the embodiment, information is transmitted between the control command value computational unit 113, the driver operation information acquisition unit 111, and the vehicle motion information acquisition unit 112 via serial communication, or information is read using an analog digital converter (ADC) that converts physical quantities into voltage signals, or the like. However, necessary information may be received from other external systems (not illustrated) via a controller area network (CAN) that is typically used as a vehicle-mounted network.

Information is transmitted between the control command value computational unit 113, the braking unit 114, and the drive unit 115 via the CAN.

<Internal Configuration of Control Command Value Computational Unit>

Figure 2:
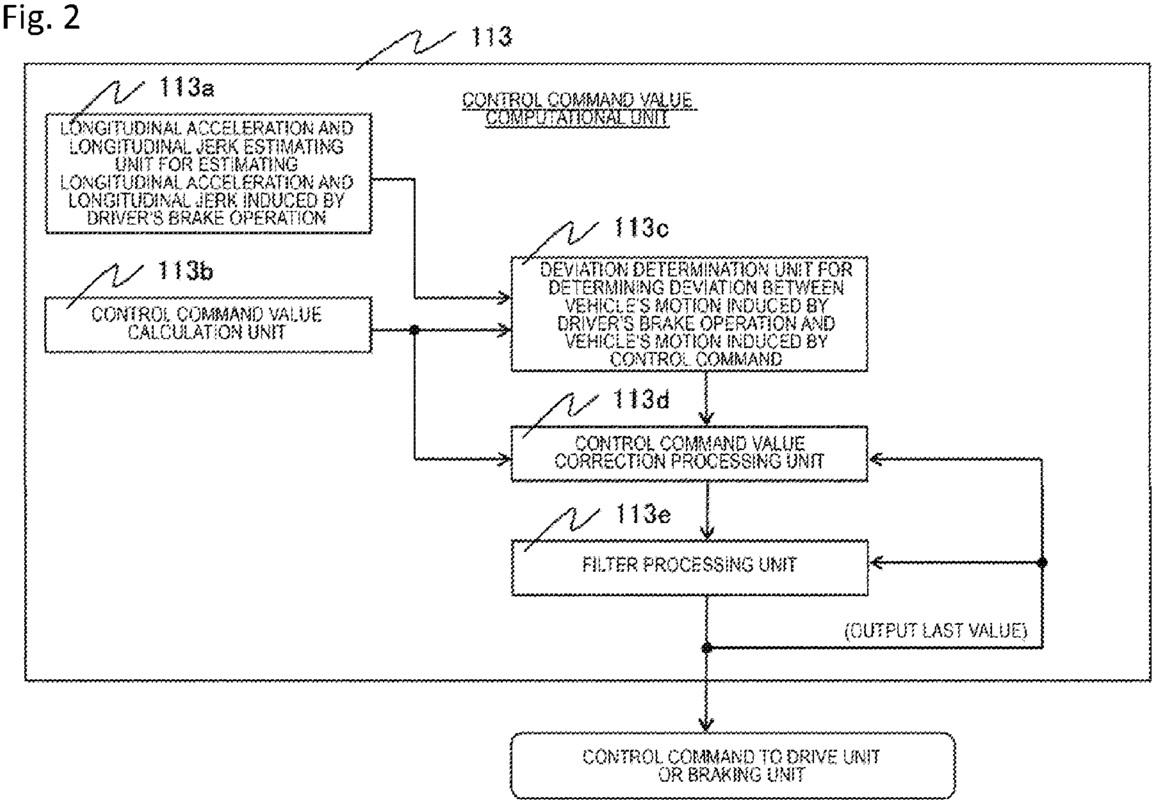
FIG. 2 is an internal block diagram of a control command value computational unit according to Embodiment 1 of the invention.

Subsequently, the internal configuration of the control command value computational unit 113 is described. FIG. 2 is a, internal block diagram of the control command value computational unit 113. In FIG. 2, a CPU, a RAM, and the like are not illustrated.

In FIG. 2, the control command value computational unit 113 includes a longitudinal acceleration and longitudinal jerk estimating unit 113*a* that estimates the longitudinal jerk of the vehicle based on the pressure of a master cylinder induced by a driver's brake operation; a control command value calculation unit 113*b* that calculates a GVC control command value; and a deviation determination unit 113*c* that determines a deviation between vehicle's motion induced by the driver's brake operation and vehicle's motion induced by control command.

A control command value correction processing unit 113*d* determines whether a value calculated by the control command value calculation unit 113*b* is to be output or the last value output from a filter processing unit 113*e* is to be output, based on a status of the deviation between the vehicle's motion induced by the driver's brake operation and the vehicle's motion induced by the control command, the status of the deviation being determined by the deviation determination unit 113*c*. The filter processing unit 113*e* calculates a final control command value obtained by processing the last output value and the value, selected by the control command value correction processing unit 113*d*, using a low pass filter (LPF), and transmits the final control command value to the drive unit 115 or the braking unit 114.

<Process Flow>

Figure 3:
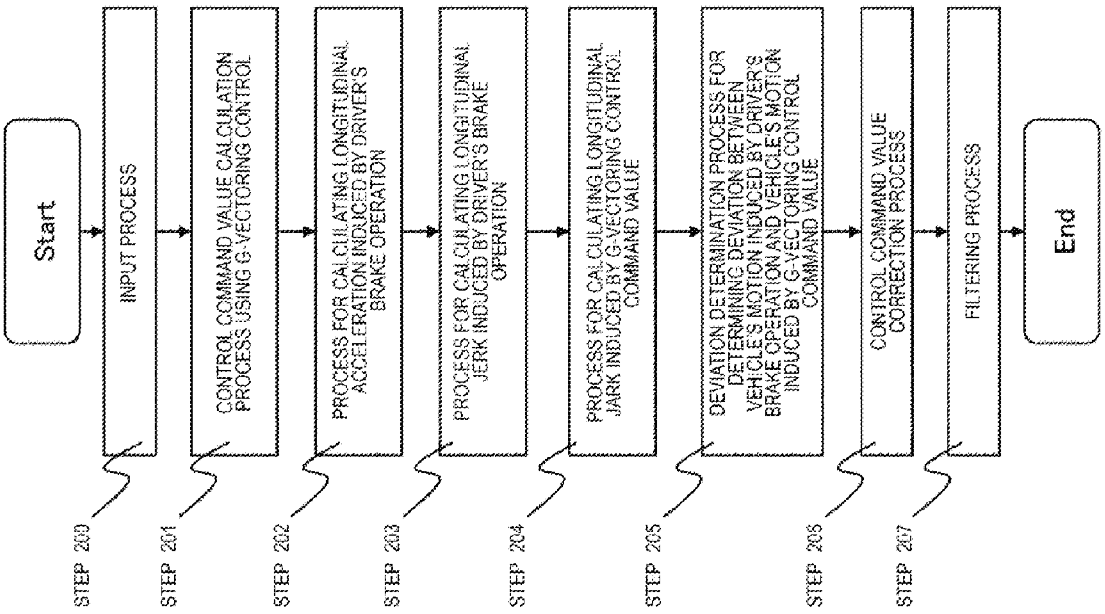
FIG. 3 is a flowchart illustrating processes executed by the control command value computational unit according to Embodiment 1 of the invention.
Figure 4:
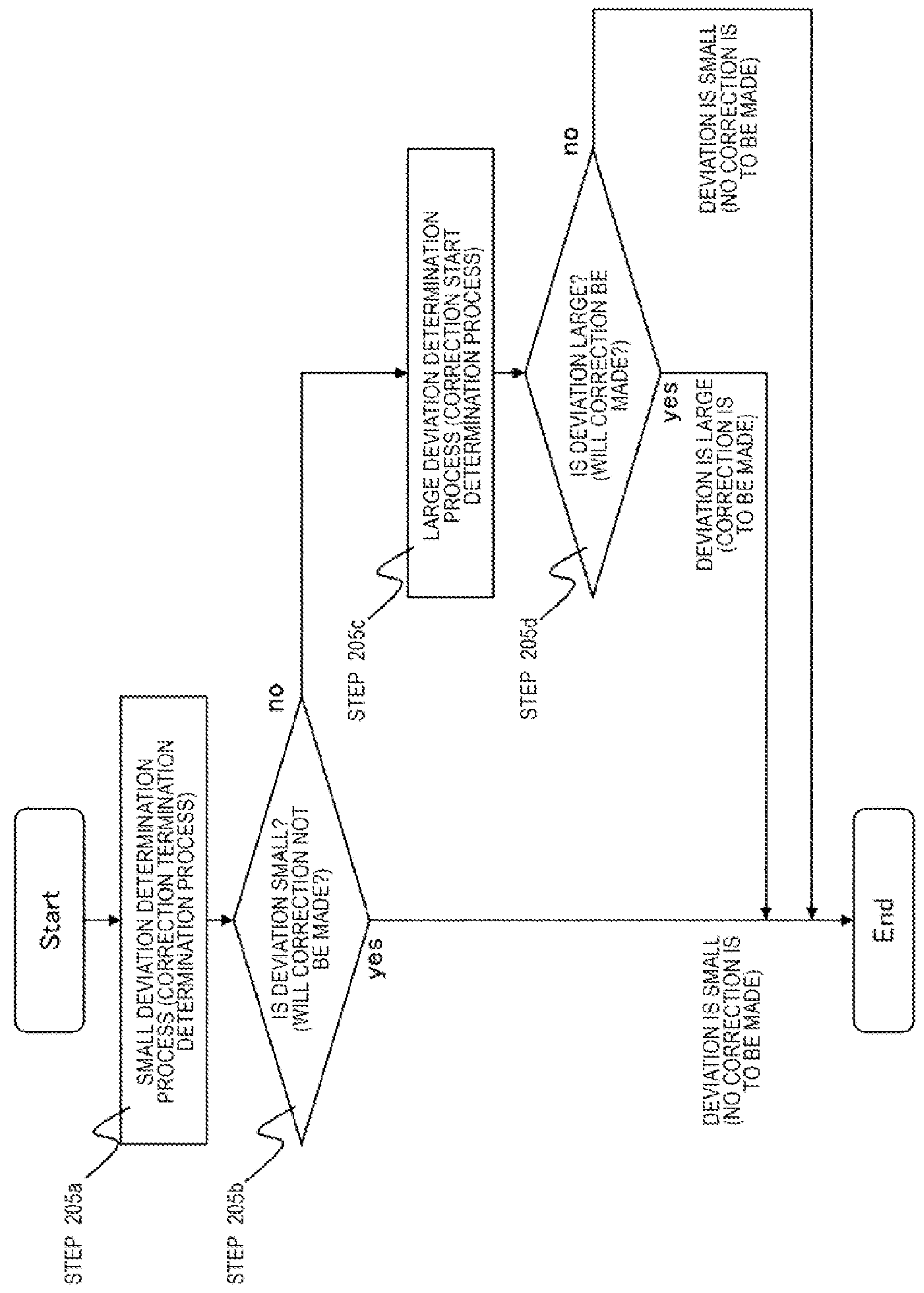
FIG. 4 is a flowchart illustrating a deviation determination process executed by the control command value computational unit according to Embodiment 1 of the invention.

Subsequently, specific processes executed by the control command value computational unit 113 of the vehicle motion control system 100 according to the embodiment are described with reference to FIG. 3. FIG. 3 is a flowchart illustrating a routine executed by the control command value computational unit 113, and the routine illustrated in FIG. 3 is repeatedly executed at predetermined time intervals.

In the embodiment to be described hereinbelow, the motion control algorithm loaded onto the control command value computational unit 113 is G-vectoring control.

Upon start-up of the routine, firstly, in step 200, an input processing unit executes an input process, and converts information, measured by the driver operation information acquisition unit 111 and the vehicle motion information acquisition unit 112, into forms of data that can be used in subsequent steps. Specifically, the input processing unit executes a physical unit conversion process or time-differential process for input signals, or calculates new physical quantities by performing computation using known physical expressions.

Subsequently, in step 201, the control command value calculation unit executes a control command value calculation process using the G-vectoring control, and a GVC control command value (Gx_GVC) is calculated using Expression 1.

[Expression 1]

$$G_{x\_GVC} = -\mathrm{sgn}(Gy \cdot \dot{G}y)\frac{C_{xy}}{1+Ts}|\dot{G}y| \text{ ※ } \dot{G}y = \mathrm{Gy\_dot} \tag{1}$$

Here, Gx_GVC: GVC control command value [G], Gy: vehicle lateral acceleration [G], Gy_dot: vehicle lateral jerk [G/s], Cxy: control gain, T: temporary delay time constant, and s: Laplacian operator.

In the embodiment, vehicle lateral acceleration and vehicle lateral jerk included in the information input from the vehicle motion information acquisition unit 112 is used in Expression 1; however, vehicle lateral acceleration and vehicle lateral jerk may be used, which are estimated from a steering angle and a host vehicle speed using known vehicle modeling. That is, the control command value represents longitudinal jerk calculated or estimated using the input, calculated, or estimated vehicle lateral jerk.

In the embodiment, the unit of the control command value calculated in step 201 is expressed as the acceleration of gravity [G], a positive value represents an acceleration control command value, and a negative value represents a deceleration control command value.

Subsequently, in step 202, the longitudinal acceleration estimating unit executes a process for calculating longitudinal acceleration induced by a driver's brake operation, and longitudinal acceleration (Gx_Drv) induced by the driver's brake operation is calculated using Expression 2.

[Expression 2]

$$Gx\_Drv = P_M * m\mathrm{MPa\_to\_}G \tag{2}$$

Here, Gx_Drv: longitudinal acceleration [G] induced by a driver's brake operation, PM: master cylinder's fluid pressure [MPa], and mMPa_to_G: acceleration conversion factor [G/MPa].

Subsequently, in step 203, the longitudinal jerk estimating unit executes a process for calculating longitudinal jerk induced by the driver's brake operation, and longitudinal jerk (Jx_Drv) induced by the driver's brake operation is calculated using Expression 3.

[Expression 3]

$$\mathrm{Jx\_Drv} = \frac{d}{dt}(\mathrm{Gx\_Drv}) \tag{3}$$

Here, Jx_Drv: longitudinal jerk [G/s] induced by a driver's brake operation, and Gx_Drv: longitudinal acceleration [G] induced by a driver's brake operation.

In the embodiment, the longitudinal acceleration and the longitudinal jerk are estimated using the acceleration conversion factor (mMPa_to_G) calculated using the fluid pressure of the master cylinder, pre-tests, and the like. Accordingly, in particular, one of the features is to more precisely read the vehicle's motion induced by the driver. However, alternatively, it is possible to deal with longitudinal acceleration, including travelling resistance, grade resistance, and the like, exerted on the vehicle using a value measured by an acceleration sensor or the like, and a value calculated by differentiating a measurement value of a global positioning system (GPS) with respect to time.

Subsequently, in step 204, a process for calculating longitudinal jerk induced by the G-vectoring control command value is executed, and longitudinal jerk (Jx_GVC) induced by the G-vectoring control command value is calculated using Expression 4.

[Expression 4]

$$\mathrm{Jx\_GVC} = \frac{d}{dt}(\mathrm{Gx\_GVC}) \tag{4}$$

Here, Jx_GVC: longitudinal jerk [G/s] induced by GVC, and Gx_GVC: GVC control command value [G] (longitudinal acceleration induced by GVC).

Subsequently, in step 205, the deviation determination unit executes a deviation determination process for determining the deviation between vehicle's motion induced by the driver's brake operation and vehicle's motion induced by the G-vectoring control command value, and calculates a correction determination status (T_status). A process flow in step 205 is described in detail with reference to FIG. 4.

Firstly, in step 205*a*, the deviation determination unit executes a small deviation determination process (correction termination determination process), and this process is executed as illustrated in Table 1. Here, the deviation determination unit determines that a deviation is small when an absolute longitudinal jerk value is less than or equal to a predetermined value. According to the content of the process defined in Table 1, it is determined whether input data satisfies conditions according to the sequence illustrated in a priority sequence column of Table 1, and when the input data satisfies the corresponding conditions, the corresponding step illustrated in an output data column is taken. When the input data satisfies preceding conditions, the determination for the subsequent conditions is not made.

TABLE 1

Logic Table for Small Deviation Determination Process (Correction Termination Determination Process)

| Priority Sequence | Input Data Absolute Value of GVC Control Command Value (ABS(Gx_GVC) | Output Data Correction Determination Status (T_status) |
|---|---|---|
| 1 | <GX_NOT_DISTURB_TH | No Correction is to be made (T_NotCorr) |
| 2 | Conditions other than Condition Listed Above | Correction Determination is to be determined (T_TBD) |

Here, T_status: correction determination status, T_NotCorr: value indicating that no correction is to be made, T_TBD: value indicating that the determination for correction is to be determined, Gx_GVC: GVC control command value [G], and Gx_NOT_DISTURB_TH: control command threshold value [G] for determining that a GVC control command value has a small effect on vehicle's motion.

Subsequently, step 205*b* is executed, and when the correction determination status (T_status) calculated in the previous step is set to the value (T_NotCorr) indicating that no correction is to be made, the process ends. When the correction determination status (T_status) is set to the value (T_TBD) indicating that determination for correction is to be determined, the process proceeds to the next step.

Subsequently, in step 205*c*, the deviation determination unit executes a large deviation determination process (correction start determination process), and this process is executed as illustrated in Table 2. That is, when the longitudinal jerk is zero, or is greater than or equal to a predetermined positive value, and the longitudinal jerk obtained by differentiating the control command value with respect to time is zero, or is less than or equal to a predetermined negative value, it is determined that the deviation is large. In contrast, when the longitudinal jerk is zero, or is greater than or equal to the predetermined positive value, and the longitudinal jerk obtained by differentiating the control command value with respect to time is zero, or is greater than the predetermined negative value, it is determined that the deviation is small.

The content of the process defined in Table 2 is the same as described above. "-" in Table 2 represents the fact that the corresponding input data does not affect output data even if the corresponding input data has any value.

Here, T_status: correction determination status, T_status_Z1: the last value for correction determination status, T_Corr: value indicating that correction is to be made, T_NotCorr: value indicating that no correction is to be made, Jx_Drv: longitudinal jerk [G/s] induced by a driver's brake operation, Jx_GVC: longitudinal jerk [G/s] induced by GVC, JERK_DRV_ACC_TH: threshold value [G/s] for determining that vehicle's motion induced by a driver's brake operation is oriented in an acceleration direction, and JERK_GVC_DEC_TH: threshold value [G/s] for determining that vehicle's motion induced by GVC is oriented in a deceleration direction.

The subsequent step 205*d* is added to the flowchart for illustrative purposes; however, actually, in step 205*c*, the determination for correction is separately made in accordance with the correction determination status (T_status) at the time of calculation, and the process ends while the correction determination status is kept as it is.

As such, step 205 has been described in detail with reference to steps 205*a* to 205*d*; however, this step can also be executed according to a single integrated logic table, and the same effects of the invention are obtained.

Subsequently, in step 206, the control command value correction unit executes a control command value correction process, and this process is executed in accordance with the correction determination status (T_status) calculated in step 205 as illustrated in Table 3. The control command value correction unit outputs the control command value which is output in the last routine, when it is determined that the deviation is large as a deviation determination result, and the control command value correction unit outputs a control command value when it is determined that the deviation is small. The content of the process defined in Table 3 is the same as described above.

TABLE 3

Logic Table for Control Command Value Correction Process

| Priority Sequence | Input Data Correction Determination Status (T_status) | Output Data Corrected Control Command Value (Gx_Corr) |
|---|---|---|
| 1 | No Correction is to be made (T_NotCorr) | GVC Control Command Value (Gx_GVC) |
| 2 | Conditions other than Condition Listed Above | Last Value for Control Command Output Value (Gx_Out_Z1) |

Here, Gx_Corr: corrected control command value [G], T_status: correction determination status, T_NotCorr: value

TABLE 2

Logic Table for Large Deviation Determination Process (Correction Start Determination Process)

| | Input Data | | | |
|---|---|---|---|---|
| Priority Sequence | Last Value for Correction Determination Status (T_status_Z1) | Longitudinal Jark Induced By Driver's Brake Operation (Jx_Drv) | Longitudinal Jark Induced By GVC (Jx_GVC) | Output Data Correction Determination Status (T_status) |
| 1 | Correction is to be made (T_Corr) | — | | Correction Is To Be Made (T_Corr) |
| 2 | Conditions other than Condition Listed Above | ≥ JARK_DRV_ACC_TH | ≤JARK_GVC_DEC_TH | |
| 3 | Conditions Other Than Conditions Listed Above | | | No Correction is to be made (T_NotCorr) |

indicating that no correction is made, Gx_GVC: GVC control command value [G], and Gx_Out_Z1: the last control command value output value [G].

Subsequently, in step 207, a filtering process is executed, and a control command value output value (Gx_Out) is calculated using the last control command value output value (Gx_Out_Z1) and the corrected control command value (Gx_Corr).

[Expression 5]

$$Gx\_Out = \frac{T_0}{T} \cdot Gx\_Corr + \left(1 - \frac{T_0}{T}\right) \cdot Gx\_Out\_Z1 \tag{5}$$

Here, Gx_Out: control command value output value [G], Gx_Corr: corrected control command value [G], Gx_Out_Z1: the last control command value output value [G], TO: sampling time [sec], and T: filter time constant [sec].

In the embodiment, a low pass filtering process using a first IIR filter is used as a filtering process. An object of the low pass filtering process using the first IIR filter is to prevent a rapid change in control command value output value when a corrected control command value is switched, and even if another filtering process is used, the intrinsic effects of the invention can be obtained.

<Example of Specific Travelling Scene>

Figure 5:
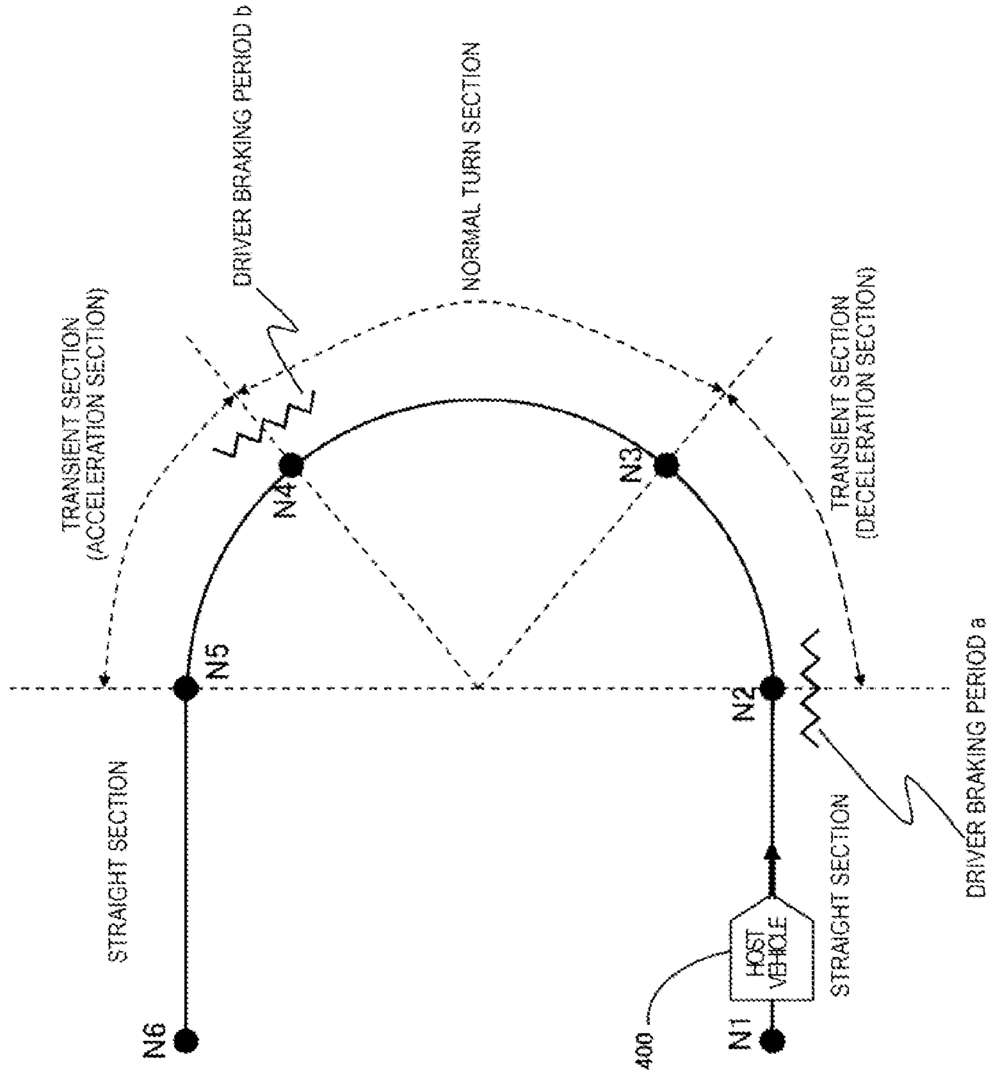
FIG. 5 is a schematic view of a travel path on which a vehicle enters and exits from a curve.

FIG. 5 is a schematic view of a travel path on which a host vehicle 400 with the vehicle motion control system according to the embodiment enters and exits from a curve. The travel path in FIG. 5 is formed of a straight section (N1 to N2); a moderate curved transient section (N2 to N3); a normal turn section (N3 to N4); a moderate curved transient section (N4 to N5); and a straight section (N5 to N6).

A description to be given hereinbelow is based on the travelling scenario that the driver enters the transient section (N2 to N3) while starting to reduce the speed of the host vehicle by applying the brakes before a point N2, ends the application of the brakes in the middle of driving (driver braking period a), passes through the normal turn section (N3 to N4) after the transient section (N2 to N3), and reduces the speed of the host vehicle by lightly re-applying the brakes before and after a point N4 (driver braking period b).

Figure 6:
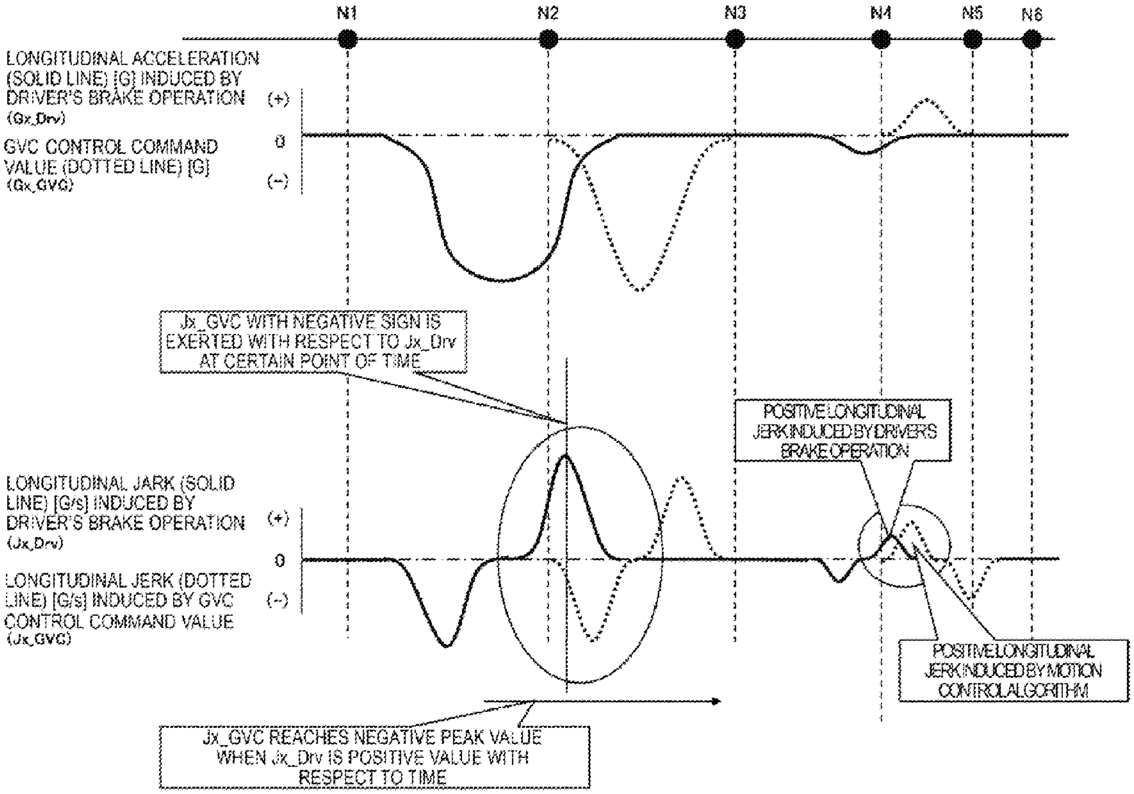
FIG. 6 is a graph illustrating an example of a control command in the related art.

Firstly, the operation of the host vehicle with a vehicle motion control system in the related art while travelling according to the aforementioned travelling scenario is described with reference to FIG. 6. FIG. 6 illustrates the following waveforms sequentially from the top: a time series waveform (solid line) for longitudinal acceleration induced by a driver's brake operation and a time series waveform (dotted line) for a GVC control command value; and a time series waveform (solid line) for longitudinal jerk induced by the driver's brake operation and a time series waveform (dotted line) for longitudinal jerk induced by the GVC control command value.

[Section (N1 to N2 to N3)]

In the initial straight section (N1 to N2), the driver maintains a constant steering angle so as to drive the host vehicle straight. For this reason, vehicle lateral acceleration exerted on the host vehicle becomes a constant value around zero, and thus a GVC control command value becomes zero.

Subsequently, when the host vehicle enters the transient section (N2 to N3), the driver starts to gradually turn a steering wheel, and to increase a steering angle. The vehicle lateral acceleration exerted on the host vehicle also increases gradually in accordance with the driver's steering operation. In addition, since vehicle lateral jerk increases as well, a deceleration control command value is calculated as a GVC control command value. Due to this control command, firstly, negative longitudinal jerk occurs in the host vehicle, and subsequently, positive longitudinal jerk occurs.

At this time, as described in the travelling scenario, the driver enters the transient section while starting to apply the brakes before the start point N2 of the transient section, and ends the application of the brakes in the middle of driving. Due to the driver's brake operation, mainly negative longitudinal jerk occurs before N2, and positive longitudinal jerk occurs after N2.

Here, in particular, with attention paid to progress after the point N2, the driver starts to gradually release the applied brakes before N2, and longitudinal acceleration decreases due to the driver's brake operation. For this reason, the longitudinal jerk induced by the driver's brake operation becomes a positive value. Since a control command (deceleration control command) induced by GVC at this point of time gradually increases in a negative direction, longitudinal jerk induced by the GVC command becomes a negative value. That is, the longitudinal jerk induced by the GVC command is exerted over time in a sign direction opposite to the sign of a value of the longitudinal jerk induced by the driver's brake operation. As time has elapsed, the longitudinal jerk induced by the driver's brake operation becomes a positive value, and the longitudinal jerk induced by the GVC command is exerted in the negative sign direction in the section in which the driver gradually releases the brakes.

In the related art, vehicle's motion when a control command value is applied to vehicle's motion induced by a driver's brake operation is not sufficiently considered, and thus jerk may be exerted in a sign direction opposite to the sign of a value of the longitudinal jerk induced by the driver's brake operation, and the "jerking motion of the vehicle" may occur. When such a state occurs, it is known that the driver or a passenger feels uncomfortable or unpleasant. In particular, when the control algorithm generates jerk in a direction opposite to a direction in which longitudinal jerk induced by driver's driving is exerted, the driver or the passenger feels very uncomfortable.

When the deviation between the longitudinal jerk induced by the driver's brake operation and the longitudinal jerk induced by the control command is large, it is desirable to adopt a technique of correcting the control command to reduce the deviation, thereby not causing the driver to feel uncomfortable.

[Section (N3 to N4 to N5)]

Subsequently, when the host vehicle enters the normal section (N3 to N4), the driver stops increasing the steering angle, and maintains a constant steering angle. At this time, since vehicle lateral acceleration exerted on the host vehicle becomes constant, and vehicle lateral jerk becomes zero as well, a GVC control command value becomes zero.

Subsequently, when the host vehicle enters the transient section (N4 to N5), the driver starts to turn the steering wheel. The vehicle lateral acceleration exerted on the host vehicle gradually decreases due to the driver's operation. Since the vehicle lateral acceleration decreases, an acceleration control command value is calculated as a GVC control command value. Due to the control command generated by the motion control algorithm, positive longitudinal jerk and negative longitudinal jerk occur in the host vehicle.

At this time, as described in the travelling scenario, the driver enters the transient section while starting to apply the brakes before a start point N4 of the transient section, and ends the application of the brakes in the middle of driving. Due to the driver's brake operation, mainly negative longitudinal jerk occurs before N4, and positive longitudinal jerk occurs after N4.

At this time, unlike the situation before and after the point N2, the sign of a value of the longitudinal jerk induced by the driver's brake operation is not opposite to the sign of a value of the longitudinal jerk induced by the GVC command, and thus the driver or the passenger does not feel uncomfortable. Accordingly, when the deviation between the longitudinal jerk induced by the driver's brake operation and the longitudinal jerk induced by the control command is small (or no deviation), it is not necessary to correct the control command.

[Straight Section (N5 to N6)]

Thereafter, when the host vehicle enters the straight section (N5 to N6), the driver stops the steering operation, and maintains a constant steering angle so as to drive the vehicle straight. Since the vehicle lateral acceleration exerted on the host vehicle becomes constant, the GVC control command value returns to zero. At this time, the longitudinal jerk also becomes a constant value around zero.

Subsequently, the operation of the host vehicle with the vehicle motion control system in Embodiment 1 while travelling according to the aforementioned travelling scenario is described with reference to FIG. 7. As described above, the vehicle motion control on the travelling path after N3 is not a problem even in the related art, and thus the description will be omitted.

Figure 7:
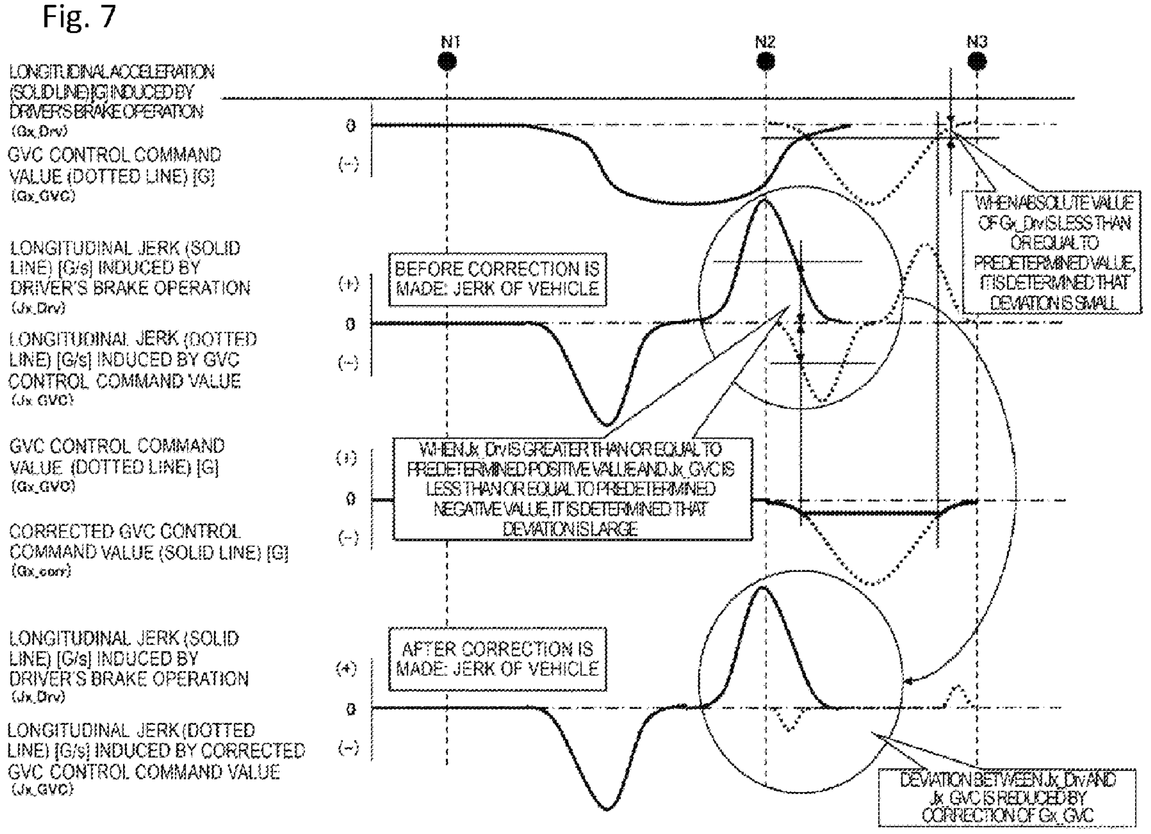
FIG. 7 is a graph illustrating an example of a control command in Embodiment 1 of the invention.

FIG. 7 illustrates the following waveforms sequentially from the top: a time series waveform (solid line) for longitudinal acceleration induced by a driver's brake operation, and a time series waveform (dotted line) for a GVC control command value; a time series waveform (solid line) for longitudinal jerk induced by the driver's brake operation, and a time series waveform (dotted line) for longitudinal jerk induced by the GVC control command value; a time series waveform (dotted line) for the GVC control command value, and a time series waveform (solid line) for a corrected GVC control command value; and a time series waveform (solid line) for longitudinal jerk induced by the driver's brake operation and a time series waveform (dotted line) for longitudinal jerk induced by the corrected GVC control command value.

[Section (N1 to N2 to N3)]

As described above, in the initial straight section (N1 to N2), a GVC control command value becomes zero.

As described in the travelling scenario, the driver starts to apply the brakes before the start point N2 of the transient section, and gradually increases the amount of brake pedal depression. At this time, the longitudinal jerk induced by the driver's brake operation decreases in the negative direction, and returns to a value around zero once reaching the negative peak value.

As described above, only the longitudinal jerk induced by the driver's brake operation is exerted on the vehicle up to the point N2.

Subsequently, when the host vehicle enters the transient section (N2 to N3), as described above, a deceleration control command value is calculated and applied as a GVC control command value, and thus the longitudinal jerk induced by the GVC increases in the negative direction.

At this time, the driver gradually reduces the amount of brake pedal depression, and thus the longitudinal jerk induced by the driver's brake operation increases in a positive direction.

Here, with attention paid to progress after the point N2, as described above, the longitudinal jerk induced by the GVC starts to be increasingly exerted in a direction opposite to a direction in which the longitudinal jerk induced by the driver's brake operation is exerted, thereby causing the occurrence (increase) of the "jerking motion of the vehicle".

In Embodiment 1 of the invention, in steps 200 to 206, when the longitudinal jerk induced by the driver's brake operation is zero, or is greater than or equal to the predetermined positive value, and the longitudinal jerk induced by the GVC (the longitudinal jerk obtained by differentiating the control command value with respect to time) is zero, or is less than or equal to the predetermined negative value, it is determined that the deviation between the vehicle's motion induced by the driver's brake operation and the vehicle's motion induced by the GVC is large. The GVC command (dotted line) correction process is executed, and as illustrated, the corrected GVC control command value (solid line) is maintained at the last value, which becomes a constant value. Accordingly, the longitudinal jerk after that point becomes zero as illustrated by the longitudinal jerk (dotted line) induced by the corrected GVC control command value, and it is possible to reduce (eliminate) discomfort of the driver or the passenger.

As described above, in Embodiment 1 of the invention, when it is determined that the "jerking motion of the vehicle" occurs due to the deviation between the longitudinal jerk induced by the driver's brake operation and the longitudinal jerk induced by the control command, the correction process is executed, and it is possible to reduce (eliminate) discomfort of the driver or the passenger.

Subsequently, the operation of the host vehicle with the vehicle motion control system in Embodiment 1 of the invention while travelling on the travelling path illustrated in FIG. 5 according to a travelling scenario different from the aforementioned travelling scenario is described with reference to FIG. 8.

In this travelling scenario, the driver starts to apply the brakes when the host vehicle is closer to the point N2 than in the aforementioned travelling scenario, passes through the transient section with the brake pedal being applied, and ends the application of the brakes after passing by the point N3. A description of the vehicle motion control on the travelling path after N3 will be omitted.

Figure 8:
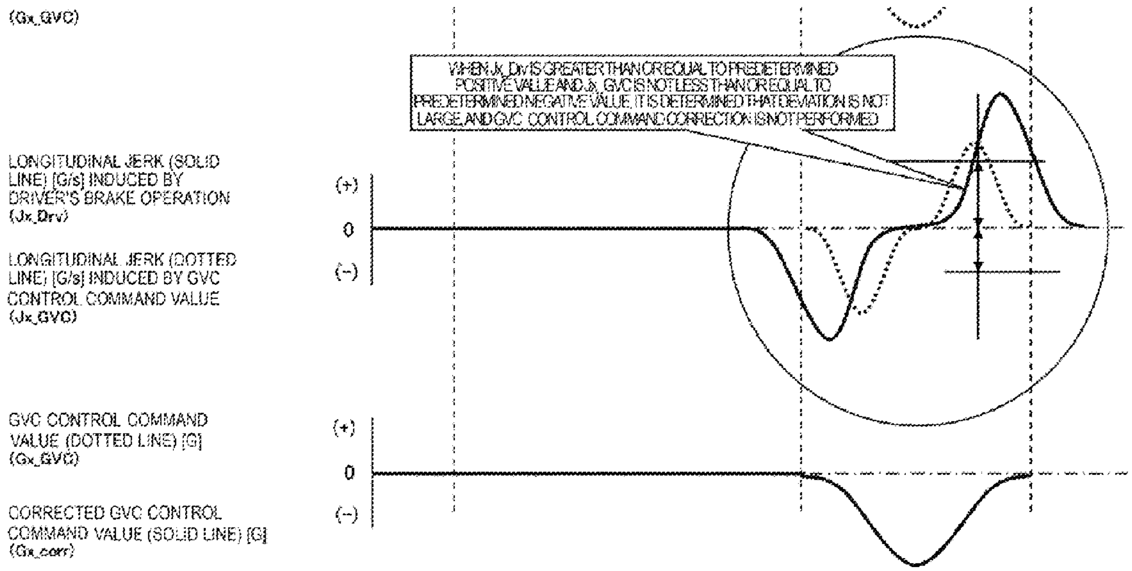
FIG. 8 is a graph illustrating another example of a control command in Embodiment 1 of the invention.

FIG. 8 illustrates the following waveforms sequentially from the top: a time series waveform (solid line) for longitudinal acceleration induced by a driver's brake operation and a time series waveform (dotted line) for a GVC control command value; a time series waveform (solid line) for longitudinal jerk induced by the driver's brake operation and a time series waveform (dotted line) for longitudinal jerk induced by the GVC control command value; and a time series waveform for the GVC control command value (dotted line) and a times series waveform (solid line) for corrected GVC control command value.

[Section (N1 to N2 to N3)]

As described above, in the initial straight section (N1 to N2), a GVC control command value becomes zero.

As described in the travelling scenario, the driver starts to apply the brakes before the start point N2 of the transient section, and gradually increases the amount of brake pedal depression. At this time, the host vehicle enters the transient section (N2 to N3) while the longitudinal jerk induced by the driver's brake operation decreases in the negative direction.

Subsequently, when the host vehicle enters the transient section (N2 to N3), as described above, a deceleration control command value is calculated and applied as a GVC control command value, and thus the longitudinal jerk induced by the GVC increases in the negative direction.

At this time, the driver further applies the brakes, and thus the longitudinal jerk induced by the driver's brake operation further increases in the negative direction, and gradually returns to a value around zero once reaching the negative peak value.

As described above, since both the longitudinal jerk induced by the driver's brake operation and the longitudinal jerk induced by the GVC become negative values in the vicinity of N2, even if the GVC control command value is applied, the "jerking motion" of the vehicle does not occur. In the subsequent section, both the longitudinal jerk induced by the driver's brake operation and the longitudinal jerk induced by the GVC become positive values. Accordingly, it is not necessary to correct the GVC control command value, and correction is not performed (since the solid line and the dotted line represent the same value, only the solid line is visible in FIG. 8).

As described above, in Embodiment 1 of the invention, when it is determined that the "jerking motion of the vehicle" due to the deviation between the longitudinal jerk induced by the driver's brake operation and the longitudinal jerk induced by the control command does not occur, the correction process is not executed, and the motion control algorithm can demonstrate its own effects.

In the embodiment described above, the motion control algorithm loaded onto the control command computational unit is the G-vectoring control; however, even if another motion control algorithm for controlling and commanding longitudinal acceleration is added, or replaces the G-vectoring control algorithm, it is possible to obtain the same effects.

(Vehicle Motion Control System in Embodiment 2)

A vehicle motion control system according to Embodiment 2 of the invention is described with reference to FIGS. 9 to 12.

Since this embodiment has many parts which are the same as or similar to those in Embodiment 1, the same configuration parts will not be described.

Figure 9:
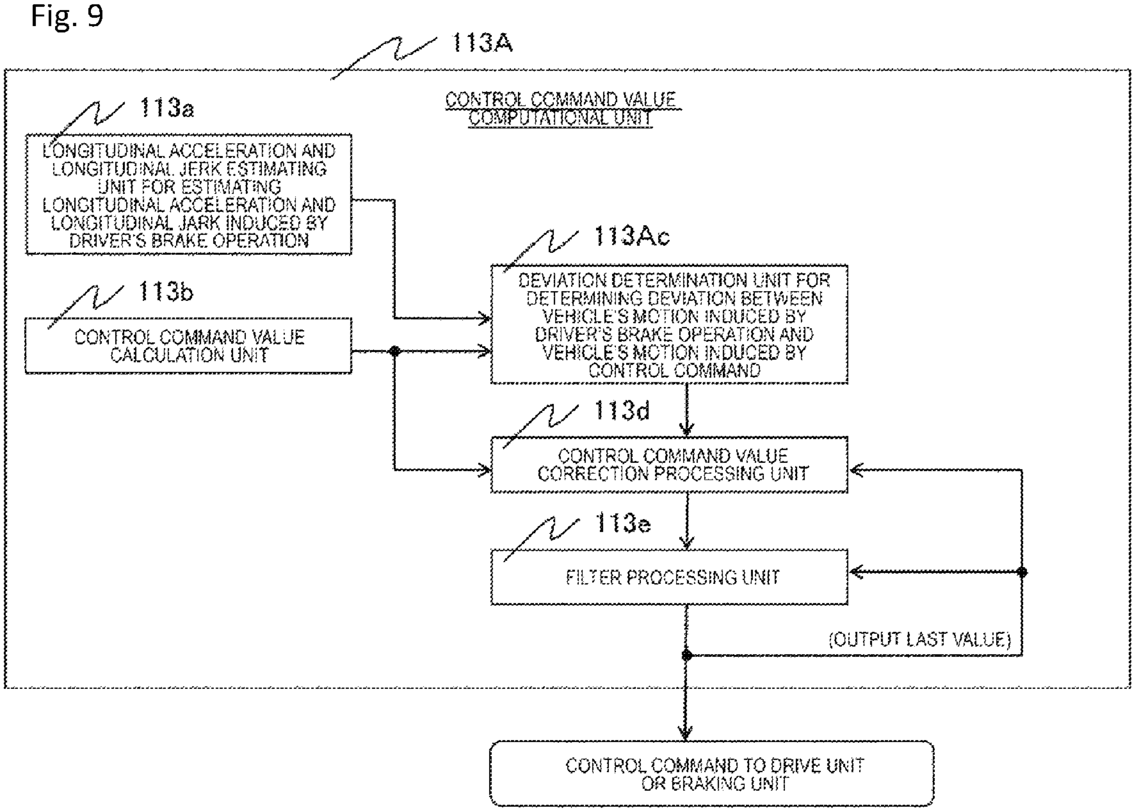
FIG. 9 is an internal block diagram of a control command value computational unit according to Embodiment 2 of the invention.

FIG. 9 is an internal block diagram of a control command computational unit 113A according to Embodiment 2 of the invention. As illustrated in FIG. 9, the control command computational unit 113A has a deviation determination unit 113Ac that determines the deviation between vehicle's motion induced by a driver's brake operation and vehicle's motion induced by control command, instead of the deviation determination unit 113*c* of the control command computational unit 113, the deviation determination unit 113*c* determining the deviation between vehicle's motion induced by a driver's brake operation and vehicle's motion induced by control command, and except for the point of difference described above, the control command computational unit 113A has the same configuration as that of the control command computational unit 113.

<Process Flow>

Figure 10:
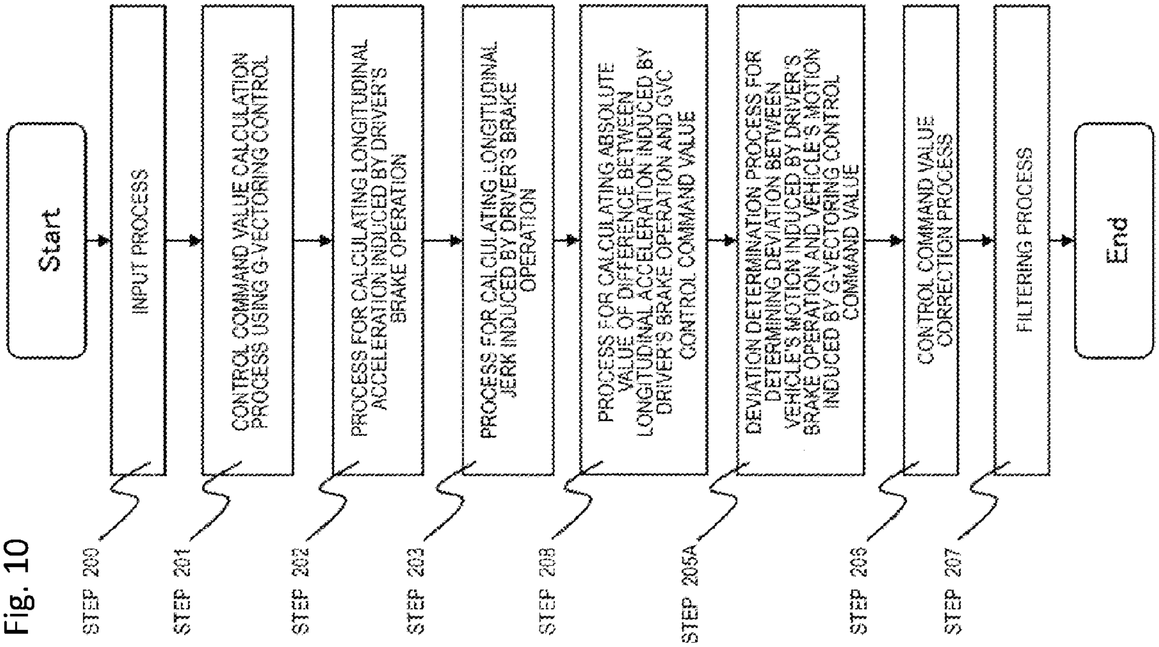
FIG. 10 is a flowchart illustrating processes executed by the control command value computational unit according to Embodiment 2 of the invention.

Subsequently, specific processes executed by the deviation determination unit 113Ac in the embodiment are described with reference to FIG. 10, the deviation determination unit 113Ac determining the deviation between vehicle's motion induced by a driver's brake operation and vehicle's motion induced by control command. FIG. 10 is a flowchart illustrating a routine executed by the control command value computational unit 113Ac, and the routine illustrated in FIG. 10 is repeatedly executed at predetermined time intervals.

In the embodiment to be described hereinbelow, the motion control algorithm loaded onto the control command value computational unit is G-vectoring control.

Steps 200 to 203 to be firstly executed upon start-up of the routine are the same as those in Embodiment 1, and descriptions will be omitted.

Subsequently, in step 208, a longitudinal acceleration difference calculation unit executes a process for calculating an absolute value of the difference between longitudinal acceleration induced by a driver's brake operation and a GVC control command value using Expression 6.

[Expression 6]

$$ABS\_Diff\_Gx = |(Gx\_Drv - Gx\_GVC)| \quad (6)$$

Here, ABS_Diff_Gx: absolute value [G] of the difference between longitudinal acceleration induced by a driver's brake operation and a GVC control command value, Gx_Drv: longitudinal acceleration [G] induced by a driver's brake operation, and Gx_GVC: GVC control command value [G].

Figure 11:
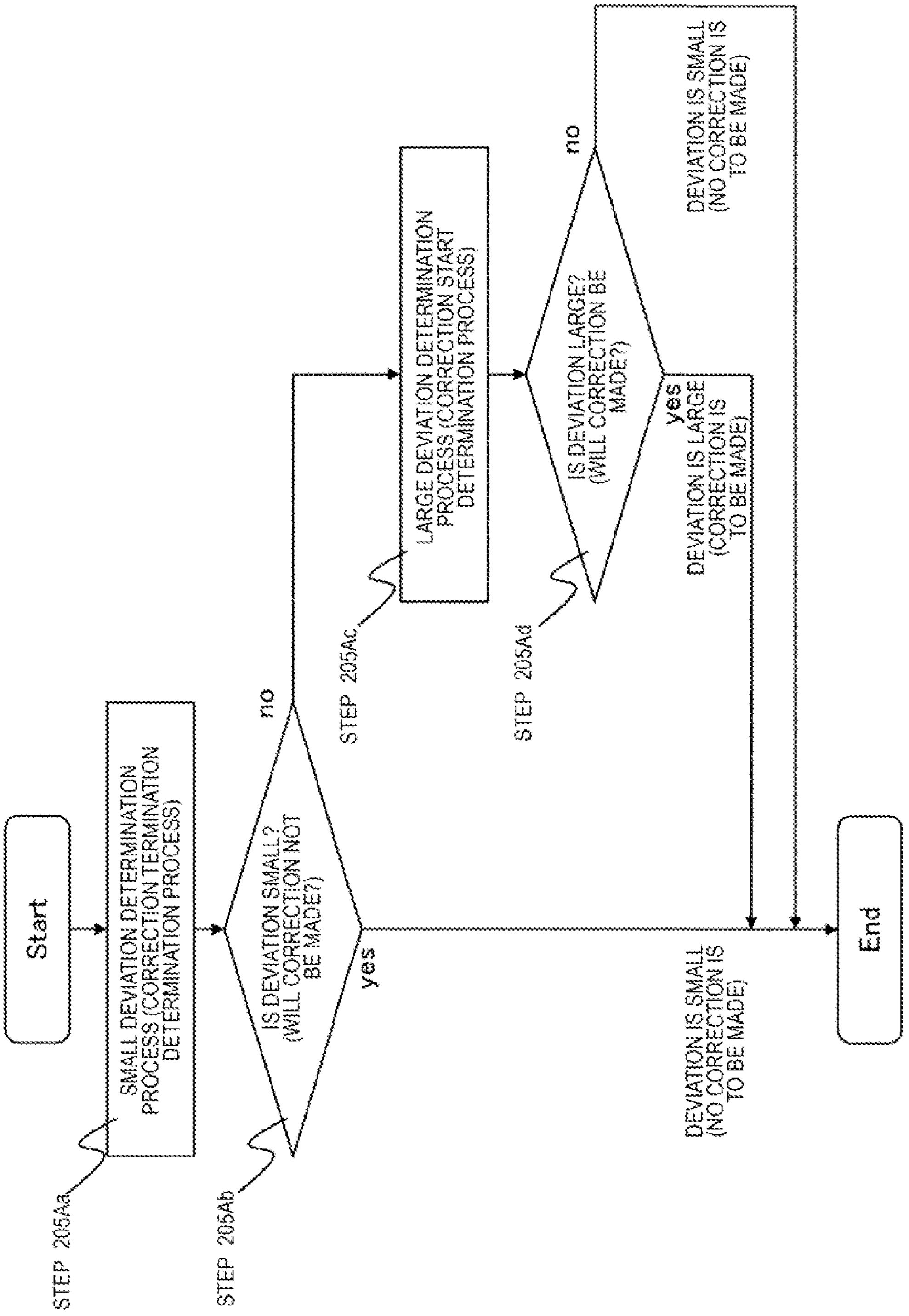
FIG. 11 is a flowchart illustrating a deviation determination process executed by the control command value computational unit according to Embodiment 2 of the invention.

Hereinafter, a process flow in step 208 is described in detail with reference to FIG. 11.

Firstly, in step 205Aa, the small deviation determination process (correction termination determination process) is executed, and this process is executed as illustrated in Table 4. According to the content of the process defined in Table 4, it is determined whether input data satisfies conditions according to the sequence illustrated in a priority sequence column of Table 4, and when the input data satisfies the corresponding conditions, the corresponding step illustrated in an output data column is taken. When the input data satisfies preceding conditions, the determination for the subsequent conditions is not made.

TABLE 4

Logic Table for Small Deviation Determination Process (Correction Termination Determination Process)

| | Input Data | | Output Data |
|---|---|---|---|
| Priority Sequence | Control command value output value (Gx_Out_Z1) | GVC Control Command Value (Gx_GVC) | Correction Determination Status (T_status) |
| 1 | >0 (Acceleration Control Command) | ≤Gx_Out_Z1 | No Correction is to be made (T_NotCorr) |
| 2 | ≤0 (Deceleration Control Command) | > Gx_Out_Z1 | No Correction is to be made (T_NotCorr) |
| 3 | Conditions Other Than Conditions Listed Above | | Correction Determination is to be made (T_TBD) |

Here, T_status: correction determination status, T_NotCorr: value indicating that no correction is to be made, T_TBD: value indicating that the determination for correction is to be determined, Jx_Drv: longitudinal jerk [G/s] induced by a driver's brake operation, Jx_DRV_LOW_TH: threshold value [G/s] for determining that there is no vehicle's motion induced by a driver's brake operation, and Gx_Out_Z1: control command value output value [G].

Subsequently, step 205Ab is executed, and when the correction determination status (T_status) calculated in the previous step is set to the value (T_NotCorr) indicating that no correction is to be made, the process ends. When the correction determination status (T_status) is set to the value (T_TBD) indicating that determination for correction is to be determined, the process proceeds to the next step.

Subsequently, in step 205Ac, the large deviation determination process (correction start determination process) is executed, and this process is executed as illustrated in Table 5. Here, when the longitudinal jerk is zero, or is greater than or equal to a predetermined positive value, and an absolute value of the difference between the longitudinal jerk and the control command value is less than or equal to a predetermined value, it is determined that the deviation is large.

The content of the process defined in Table 5 is the same as described above. "-" in Table 5 represents the fact that the corresponding input data does not affect output data even if the corresponding input data has any value.

TABLE 5

Logic Table for Large Deviation Determination Process
(Correction Start Determination Process)

| Priority Sequence | Input Data | | | Output Data |
|---|---|---|---|---|
| | Last Value for Correction Determination Status (T_status_Z1) | Longitudinal Jark Induced By Driver's Brake Operation (Jx_Drv) | Absolute Value of Difference Between Longitudinal Acceleration Induced By Driver's Brake Operation and GVC Control Command Value (ABS_Diff_Gx) | Correction Determination Status (T_status) |
| 1 | Correction is to be Made (T_Corr) | | — | Correction is to be made (T_Corr) |
| 2 | Conditions Other Than | ≥JARK_DRV_ACC_TH2 | ≤GX_DRV_AND_GVC_EQUAL_TH | |
| 3 | Condition Listed Above | Conditions other than Conditions Listed Above | | No Correction is to be made (T_NotCorr) |

Here, T_status: correction determination status, T_status_Z1: the last value for correction determination status, T_Corr: value indicating that correction is to be made, T_NotCorr: value indicating that no correction is to be made, Jx_Drv: longitudinal jerk [G/s] induced by a driver's brake operation, ABS_Diff_Gx: absolute value [G] of the difference between longitudinal jerk induced by a driver's brake operation and GVC control command value; JERK_DRV_ACC_TH2: threshold value [G/s] for determining that vehicle's motion induced by a driver's brake operation is oriented in an acceleration direction, and GX_DRV_AND_GVC_EQUAL_TH: threshold value [G] for determining that longitudinal jerk induced by a driver's brake operation is equal to GVC deceleration control command.

The subsequent step 205Ad is added to the flowchart for illustrative purposes; however, actually, in step 205Ac, the determination for correction is separately made in accordance with the correction determination status (T_status) at the time of calculation, and then the process ends while the correction determination status is kept as it is.

As such, step 205A has been described in detail with reference to steps 205Aa to 205Ad; however, this step can also be executed according to a single integrated logic table, and the same effects of the invention are obtained.

Steps 206 and 207 to be subsequently executed are the same as those in Embodiment 1, and descriptions will be omitted.

<Example of Specific Travelling Scene>

The operation of the host vehicle in this embodiment while travelling on the travelling path illustrated in FIG. 5 is described with reference to FIG. 12. According to a travelling scenario in this case, the driver enters the transient section (N2 to N3) while starting to reduce the speed of the host vehicle by applying the brakes before the point N2, and ends the application of the brakes in the middle of driving. The vehicle motion control on the travelling path after N3 will not described.

Figure 12:
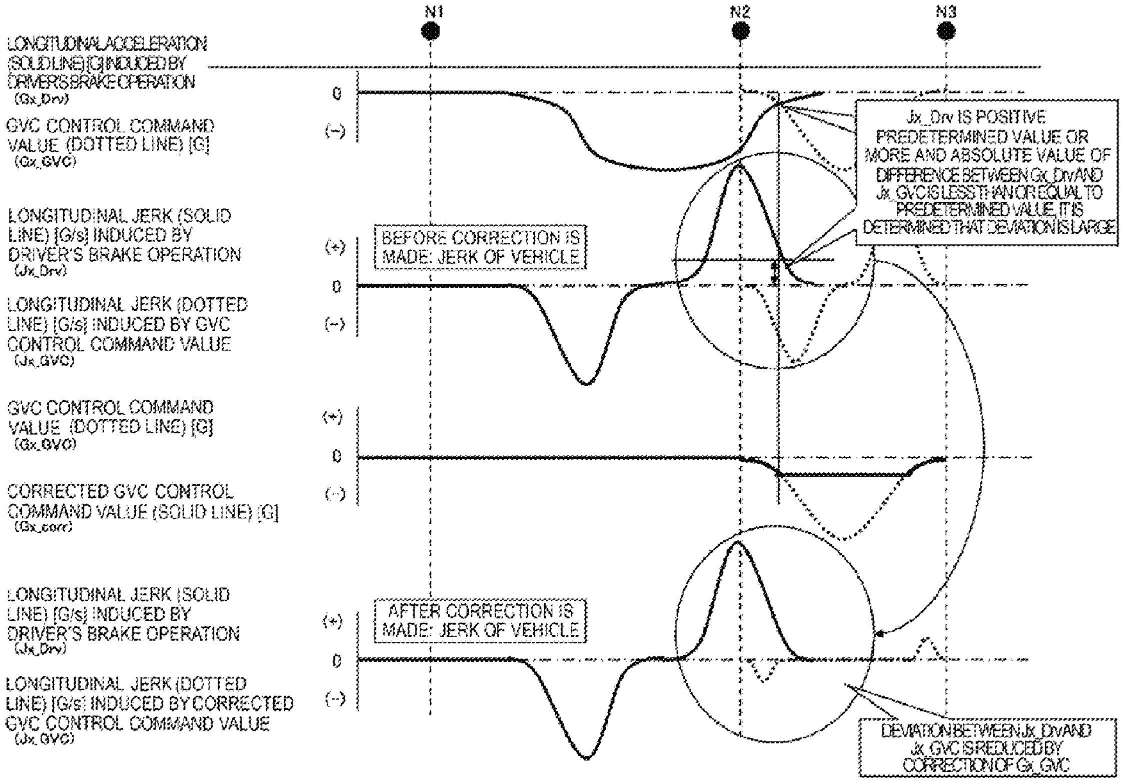
FIG. 12 is a graph illustrating an example of a control command in Embodiment 2 of the invention.

FIG. 12 illustrates the following waveforms sequentially from the top: a time series waveform (solid line) for longitudinal acceleration induced by a driver's brake operation, and a time series waveform (dotted line) for a GVC control command value; a time series waveform (solid line) for longitudinal jerk induced by the driver's brake operation, and a time series waveform (dotted line) for longitudinal jerk induced by the GVC control command; a time series waveform (dotted line) for the GVC control command, and a time series waveform (solid line) for a corrected GVC control command value; and a time series waveform (solid line) for longitudinal jerk induced by the driver's brake operation and a time series waveform (dotted line) for longitudinal jerk induced by the corrected GVC control command.

[Section (N1 to N2 to N3)]

In the initial straight section (N1 to N2), the driver maintains a constant steering angle so as to drive the host vehicle straight. For this reason, vehicle lateral acceleration exerted on the host vehicle becomes a constant value around zero, and thus a GVC command value becomes zero.

As described in the travelling scenario, the driver starts to apply the brakes before the start point N2 of the transient section, and to gradually increase the amount of brake pedal depression. At this time, the host vehicle enters the transient section (N2 to N3) while the longitudinal jerk induced by the driver's brake operation decreases in the negative direction.

As described above, only the longitudinal jerk induced by the driver's brake operation is exerted on the vehicle up to the point N2.

Subsequently, when the host vehicle enters the transient section (N2 to N3), the driver starts to gradually turn the steering wheel, and to increase a steering angle. The vehicle lateral acceleration exerted on the host vehicle also increases gradually in accordance with the driver's steering operation. In addition, since vehicle lateral jerk increases as well, a deceleration control command value is calculated and applied as a GVC control command value, and the longitudinal jerk induced by the GVC increases in the negative direction.

In contrast, since the driver gradually reduces the amount of brake pedal depression, the longitudinal jerk induced by the driver's brake operation increases in the positive direction.

Here, with attention paid to progress after the point N2, as described above, the longitudinal jerk induced by the GVC starts to be increasingly exerted in the direction opposite to a direction in which the longitudinal jerk induced by the driver's brake operation is exerted, thereby causing the occurrence (increase) of the "jerking motion of the vehicle".

In Embodiment 2 of the invention, in steps 200 to 208, when the longitudinal jerk induced by the driver's brake operation is zero, or is greater than or equal to the predetermined positive value, and an absolute value of the difference between the longitudinal acceleration by the driver's brake operation and the GVC control command value is less than or equal to the predetermined value, it is determined that the deviation is large. The GVC command (dotted line) correction process is executed, and as illustrated, the corrected GVC control command (solid line) is maintained at the last value, which becomes a constant value. Accordingly, the longitudinal jerk after that point becomes zero as illustrated by the longitudinal jerk (dotted line) induced by the corrected GVC control command value, and it is possible to reduce (eliminate) discomfort of the driver or the passenger.

As described above, also in Embodiment 2 of the invention, when it is determined that the "jerking motion of the vehicle" occurs due to the deviation between the longitudinal jerk induced by the driver's brake operation and the longitudinal jerk induced by the control command, the correction process is executed, and it is possible to reduce (eliminate) discomfort of the driver or the passenger.

In the embodiment described above, the motion control algorithm loaded onto the control command computational unit is the G-vectoring control; however, even if another motion control algorithm for controlling and commanding longitudinal acceleration is added, or replaces the G-vectoring control algorithm, it is possible to obtain the same effects.

(Vehicle Motion Control System in Embodiment 3)

A vehicle motion control system according to Embodiment 3 of the invention is described with reference to FIGS. 13 to 14.

Since this embodiment has many parts which are the same as or similar to those in Embodiment 1 and Embodiment 2, the same configuration parts will not be described.

Figure 13:
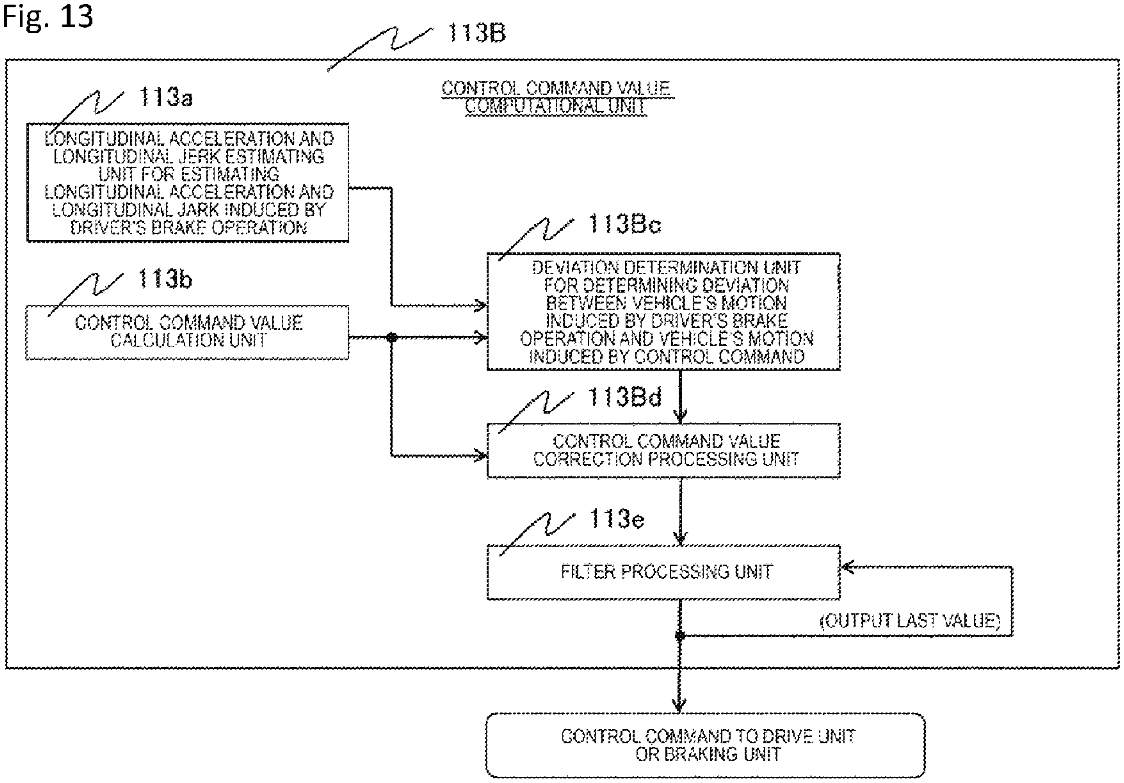
FIG. 13 is an internal block diagram of a control command value computational unit according to Embodiment 3 of the invention.
Figure 14:
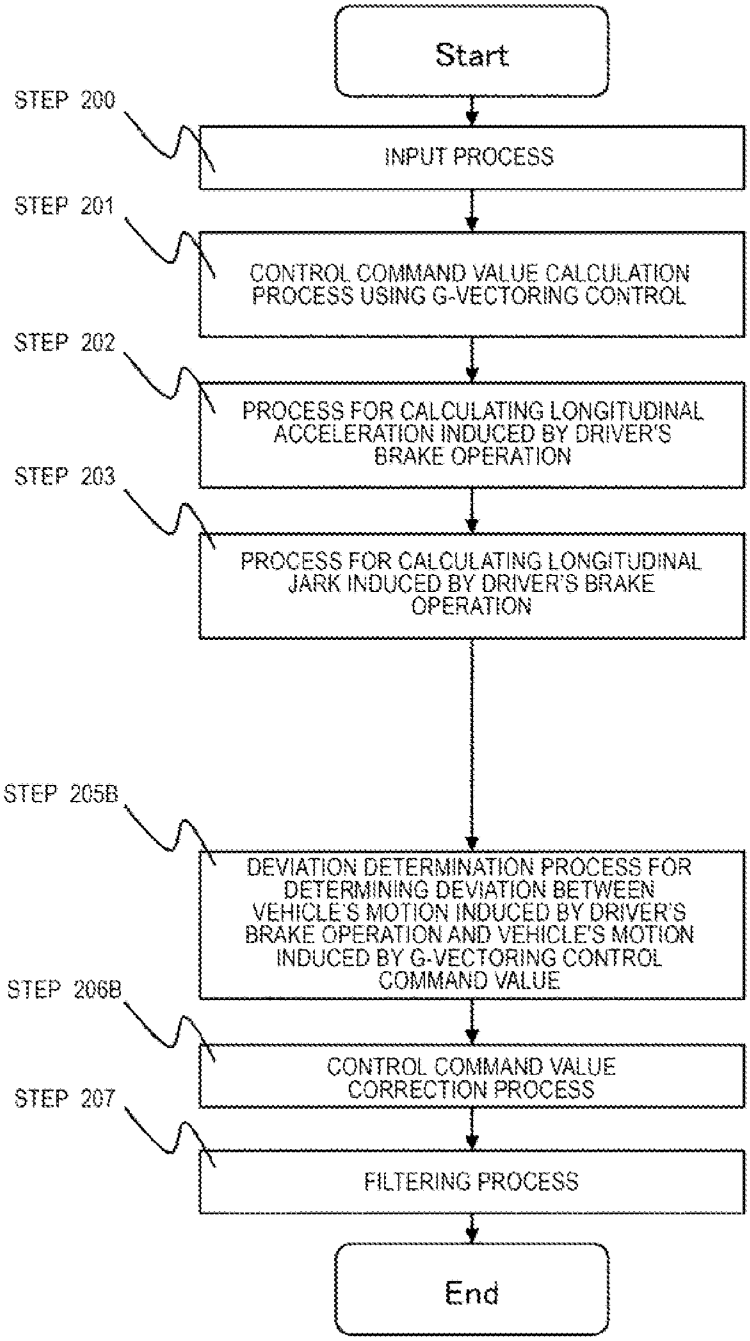
FIG. 14 is a flowchart illustrating processes executed by the control command value computational unit according to Embodiment 3 of the invention.

FIG. 13 is an internal block diagram of a control command computational unit according to Embodiment 3 of the invention. As illustrated in FIG. 13, a control command computational unit 113B has a deviation determination unit 113Bc and a control command value correction processing unit 113Bd, instead of the deviation determination unit 113*c* which determines the deviation between vehicle's motion induced by a driver's brake operation and vehicle's motion induced by control command, and the control command value correction processing unit 113*d* of the control command computational unit 113 illustrated in FIG. 2, and except for the point of difference described above, the control command computational unit 113B has the same configuration as that of the control command computational unit 113.

<Process Flow>

Subsequently, specific processes executed by the deviation determination unit 113Bc and the control command value correction processing unit 13Bd in the embodiment are described with reference to FIG. 14, the deviation determination unit 113Bc determining the deviation between vehicle's motion induced by a driver's brake operation and vehicle's motion induced by control command. FIG. 14 is a flowchart illustrating a routine executed by the control command value computational unit 113Bc, and the routine illustrated in FIG. 14 is repeatedly executed at predetermined time intervals.

In the embodiment to be described hereinbelow, the motion control algorithm loaded onto the control command value computational unit is G-vectoring control.

Steps 200 to 203 to be firstly executed upon start-up of the routine are the same as those in Embodiment 1, and descriptions will be omitted.

Figure 15:
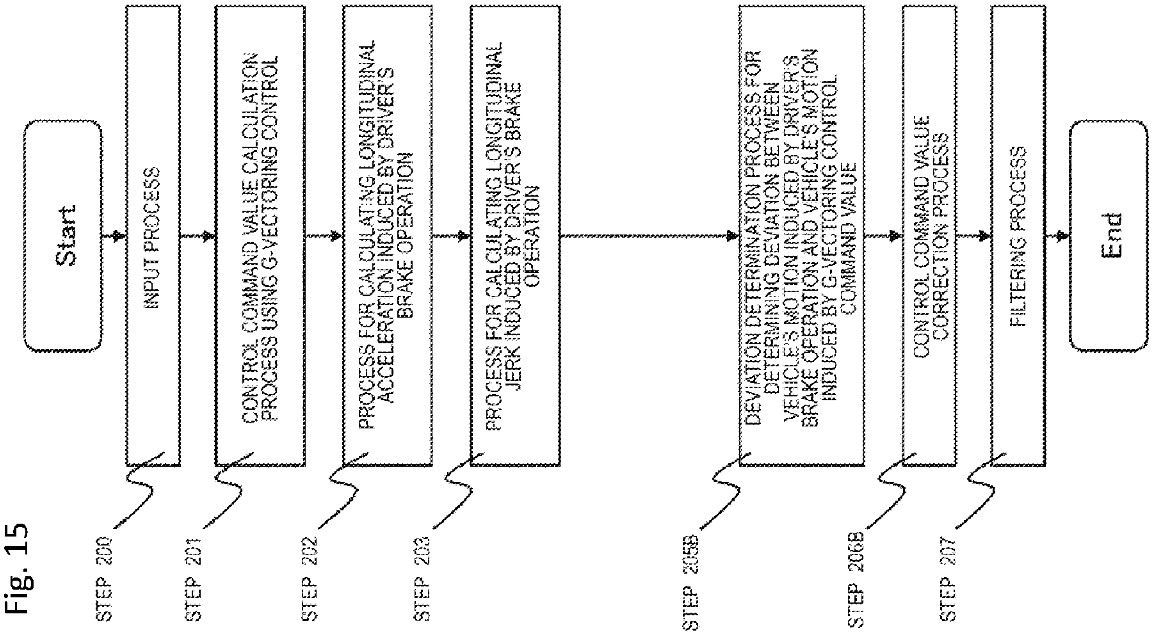
FIG. 15 is a flowchart illustrating a deviation determination process executed by the control command value computational unit according to Embodiment 3 of the invention.

Subsequently, in step 205B, the process for determining the deviation between vehicle's motion induced by the driver's brake operation and vehicle's motion induced by a G-vectoring control command value is executed, and the correction determination status (T_status) is calculated. A process flow in step 205B is described in detail with reference to FIG. 15.

Firstly, in step 205Ba, the small deviation determination process (correction termination determination process) is executed, and this process is executed as illustrated in Table 6. According to the content of the process defined in Table 6, it is determined whether input data satisfies conditions according to the sequence illustrated in a priority sequence column of Table 6, and when the input data satisfies the corresponding conditions, the corresponding step illustrated in an output data column is taken. When the input data satisfies preceding conditions, the determination for the subsequent conditions is not made.

TABLE 6

Logic Table for Small Deviation Determination Process (Correction Termination Determination Process)

| Priority Sequence | Input Data Absolute Value of Longitudinal Jark Induced By Driver's Brake Operation (ABS(Jx_Drv)) | Output Data Correction Determination Status (T_status) |
|---|---|---|
| 1 | <JARK_DRV_LOW_TH | No Correction is to be made (T_NotCorr) |
| 2 | Conditions other than Condition Listed Above | Correction Determination is to be determined (T_TBD) |

Here, T_status: correction determination status, T_NotCorr: value indicating that no correction is to be made, T_TBD: value indicating that the determination for correction is to be determined, Jx_Drv: longitudinal jerk [G/s] induced by a driver's brake operation, and JARX_DRV_LOW_TH: threshold value [G/s] for determining that there is no vehicle's motion induced by a driver's brake operation.

Subsequently, step 205Bb is executed, and when the correction determination status (T_status) calculated in the previous step is set to the value (T_NotCorr) indicating that no correction is to be made, the process ends. When the correction determination status (T_status) is set to the value (T_TBD) indicating that determination for correction is to be determined, the process proceeds to the next step.

Subsequently, in step 205Bc, the large deviation determination process (correction start determination process) is executed, and this process is executed as illustrated in Table 7. Here, when the longitudinal jerk is zero, or is greater than or equal to a predetermined positive value, and a control command value is a negative value, it is determined that the deviation is large.

The content of the process defined in Table 7 is the same as described above. "-" in Table 7 represents the fact that the corresponding input data does not affect output data even if the corresponding input data has any value.

TABLE 7

Logic Table for Large Deviation Determination Process (Correction Start Determination Process)

| Priority Sequence | Input Data: Last Value for Correction Determination Status (T_status_Z1) | Input Data: Longitudinal Jerk Induced By Driver's Brake Operation (Jx_Drv) | Input Data: GVC Control Command Value (Gx_GVC) | Output Data Correction Determination Status (T_status) |
|---|---|---|---|---|
| 1 | Correction is to be made (T_Corr) | — | | Correction is to be made (T_Corr) |
| 2 | Conditions other than Condition Listed Above | ≥JARK_DRV_ACC_TH3 | ≤GX_GVC_DEC_TH | |
| 3 | | Conditions other than Conditions Listed Above | | No Correction is to be made (T_NotCorr) |

Here, T_status: correction determination status, T_status_Z1: the last value for correction determination status, T_Corr: value indicating that correction is to be made, T_NotCorr: value indicating that no correction is to be made, Jx_Drv: longitudinal jerk [G/s] induced by a driver's brake operation, ABS_Diff_Gx: absolute value [G] of the difference between longitudinal jerk induced by a driver's brake operation and GVC control command value; JERK_DRV_ACC_TH2: threshold value [G/s] for determining that vehicle's motion induced by a driver's brake operation is oriented in an acceleration direction, and GX_GVC_DEC_TH: threshold value [G] for determining that a GVC control command value affects vehicle's motion.

The subsequent step 205Bd is added to the flowchart for illustrative purposes; however, actually, in step 205Bc, the determination for correction is separately made in accordance with the correction determination status (T_status) at the time of calculation, and then the process ends while the correction determination status is kept as it is.

As such, step 205B has been described in detail with reference to steps 205Ba to 205Bd; however, this step can also be executed according to a single integrated logic table, and the same effects of the invention are obtained.

Subsequently, in step 206B, the control command value correction unit executes the control command value correction process, and this process is executed in accordance with the correction determination status (T_status) calculated in step 205B as illustrated in Table 8. The control command value correction unit outputs a control command value of zero, when it is determined that the deviation is large as a deviation determination result, and the control command value correction unit outputs the control command value when it is determined that the deviation is small.

The content of the process defined in Table 8 is the same as described above.

TABLE 8

Logic Table for Control Command Value Correction Process

| Priority Sequence | Input Data Correction Determination Status (T_status) | Output Data Corrected Control Command Value (Gx_Corr) |
|---|---|---|
| 1 | No Correction is to be made (T_NotCorr) | GVC Control Command Value (Gx_GVC) |
| 2 | Conditions other than Condition Listed Above | Zero |

Here, Gx_Corr: corrected control command value [G], T_status: correction determination status, T_NotCorr: value indicating that no correction is made, and Gx_GVC: GVC control command value [G].

In this process, when it is determined that correction is to be made, the corrected control command value is set to zero. Therefore, actually, control command is prevented from being output. When control command has been output until the last routine, and a control command value is abruptly set to zero, the jerking motion of the vehicle may occur; however, it is possible to prevent the occurrence of the jerking motion of the vehicle by smoothly converging the control command value to zero via the filtering process in step 207.

Steps 206 and 207 to be subsequently executed are the same as those in Embodiment 1, and descriptions will be omitted.

<Example of Specific Travelling Scene>

The operation of the host vehicle in this embodiment while travelling on the travelling path illustrated in FIG. 5 is described with reference to FIG. 16. According to a travelling scenario in this case, the driver enters the transient section (N2 to N3) while starting to reduce the speed of the host vehicle by applying the brakes before the point N2, and ends the application of the brakes in the middle of driving. The vehicle motion control on the travelling path after N3 will not described.

Figure 16:
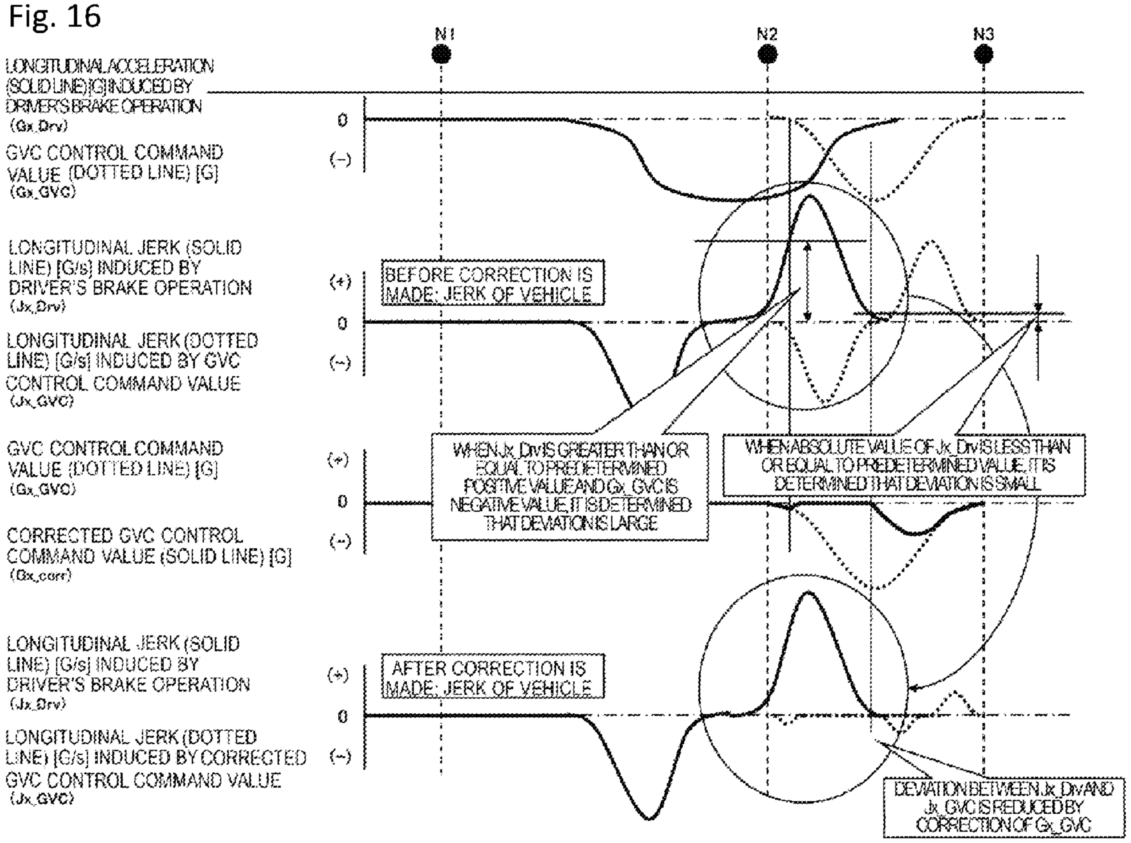
FIG. 16 is a graph illustrating an example of a control command in Embodiment 3 of the invention.

FIG. 16 illustrates the following waveforms sequentially from the top: a time series waveform (solid line) for longitudinal acceleration induced by a driver's brake operation, and a time series waveform (dotted line) for a GVC control command value; a time series waveform (solid line) for longitudinal jerk induced by the driver's brake operation, and a time series waveform (dotted line) for longitudinal jerk induced by the GVC control command value; a time series waveform (dotted line) for the GVC control command value, and a time series waveform (solid line) for a corrected GVC control command value; and a time series waveform (solid line) for longitudinal jerk induced by the driver's brake operation and a time series waveform (dotted line) for longitudinal jerk induced by the corrected GVC control command value.

[Section (N1 to N2 to N3)]

In the initial straight section (N1 to N2), the driver maintains a constant steering angle so as to drive the host vehicle straight. For this reason, vehicle lateral acceleration exerted on the host vehicle becomes a constant value around zero, and thus a GVC command value becomes zero.

As described in the travelling scenario, the driver starts to apply the brakes before the start point N2 of the transient section, and to gradually increase the amount of brake pedal depression. At this time, the host vehicle enters the transient section (N2 to N3) while the longitudinal jerk induced by the driver's brake operation decreases in the negative direction.

As described above, only the longitudinal jerk induced by the driver's brake operation is exerted on the vehicle up to the point N2.

Subsequently, when the host vehicle enters the transient section (N2 to N3), the driver starts to gradually turn the steering wheel, and to increase a steering angle. The vehicle lateral acceleration exerted on the host vehicle also increases gradually in accordance with the driver's steering operation. In addition, since vehicle lateral jerk increases as well, a deceleration control command value is calculated and applied as a GVC control command value, and the longitudinal jerk induced by the GVC increases in the negative direction.

In contrast, since the driver gradually reduces the amount of brake pedal depression, the longitudinal jerk induced by the driver's brake operation increases in the positive direction.

Here, with attention paid to progress after the point N2, as described above, the longitudinal jerk induced by the GVC starts to be increasingly exerted in the direction opposite to a direction in which the longitudinal jerk induced by the driver's brake operation is exerted, thereby causing the occurrence (increase) of the "jerking motion of the vehicle". In Embodiment 3 of the invention, in steps 200 to 208, when the longitudinal jerk induced by the driver's brake operation is zero, or is greater than or equal to the predetermined positive value, and the GVC control command value is a negative value, it is determined that the deviation is large. The GVC control command (dotted line) correction process is executed, and as illustrated in the corrected GVC control command (solid line), the longitudinal jerk is set to zero. Accordingly, the longitudinal jerk after that point becomes zero as illustrated by the longitudinal jerk (dotted line) induced by the corrected GVC control command value, and it is possible to reduce (eliminate) discomfort of the driver or the passenger. In Embodiment 3 of the invention, when an absolute value of the longitudinal jerk induced by the driver's brake operation is less than or equal to a predetermined value, it is determined that the deviation is small, and control command is re-applied; however, since it is determined that there is already no vehicle's motion induced by the driver's brake operation, it is possible to sufficiently reduce discomfort of the driver or the passenger.

As described above, also in Embodiment 3 of the invention, when it is determined that the "jerking motion of the vehicle" occurs due to the deviation between the longitudinal jerk induced by the driver's brake operation and the longitudinal jerk induced by the control command, the correction process is executed, and it is possible to reduce (eliminate) discomfort of the driver or the passenger.

In the embodiment described above, the motion control algorithm loaded onto the control command computational unit is the G-vectoring control; however, even if another motion control algorithm for controlling and commanding longitudinal acceleration is added, or replaces the G-vectoring control algorithm, it is possible to obtain the same effects.

The embodiments of the invention have been described in detail with reference to the accompanying drawings; however, a specific configuration is not limited to that in the embodiments, and the invention includes a design change or the like insofar as the design change does not depart from the purport of the invention. For example, the embodiments have been described in detail for easy understanding of the invention, and the invention is not limited to the configuration that includes all the aforementioned configuration elements. A portion of the configuration elements of an embodiment can be replaced with those of another embodiment, and a portion of the configuration elements of an embodiment can be added to the configuration of another embodiment. The addition of other configuration elements, or the removal and replacement of a portion of the configuration elements of each embodiment can be made.

Specifically, the G-vectoring control is used as the motion control algorithm illustrated in the embodiments; however, adaptive cruise control (ACC) or pre-crash control may be used as the motion control algorithm, or a motion control algorithm in which two or more control methods are assembled may be used.

Hardware may be realized, on which a part or all of the configuration elements, the functions, the processing unit, and the like are designed into an integrated circuit. The configuration elements, the functions, and the like may be realized by software in such a manner that a processor analyzes and executes programs for realizing the functions. It is possible to store information such as the programs for realizing the functions, the tables, and the filters in a storage device such as a memory, a hard disk, or a solid state drive (SSD), or in a storage device such as an IC card, an SD card, a DVD.

REFERENCE SIGNS LIST

100: vehicle motion control system
111: driver operation information acquisition unit
112: vehicle motion information acquisition unit
113: control command computational unit
114: braking unit
115: drive unit

The invention claimed is:

1. A vehicle motion control system comprising:

one or more sensors; and a control command value computational unit communicatively coupled to the one or more sensors, wherein the control command value computational unit includes:

a read only memory, an input/output interface, and a processor communicatively coupled to the read only memory and the input/output interface;

wherein the processor:

determines a fluid pressure in a master cylinder of a vehicle, or a location measured by a global positioning system, or a value measured by an acceleration sensor;

calculates a control command value based on the fluid pressure in the master cylinder of the vehicle, or the location measured by the global position system, or the value measured by the acceleration sensor;

calculates a longitudinal acceleration of the vehicle induced by a driver's brake operation based on an input from the one or more sensors;

calculates a longitudinal jerk of the vehicle by differentiating the longitudinal acceleration with respect to time;

determines a deviation between vehicle's motion induced by the driver's brake operation and vehicle's motion induced by a control command using the longitudinal jerk and the control command value;

selectively corrects the control command in accordance with the deviation; and automatically controls braking and acceleration of the vehicle based on the control command.

2. The vehicle motion control system according to claim 1, wherein the processor selectively corrects the control command, when the longitudinal jerk is zero, or is greater than or equal to a predetermined positive value, and the longitudinal jerk, obtained by differentiating the control command value with respect to time, is zero, or is less than or equal to a predetermined negative value.

3. The vehicle motion control system according to claim 1, wherein the processor does not selectively correct the control command when an absolute value of the longitudinal jerk is less than or equal to a predetermined value.

4. The vehicle motion control system according to claim 1, wherein the processor does not selectively correct the control command when the longitudinal jerk is zero, or is greater than or equal to a predetermined positive value, and the longitudinal jerk, obtained by differentiating the control command value with respect to time, is zero, or is greater than a predetermined negative value.

5. The vehicle motion control system according to claim 1, wherein the vehicle's motion induced by the driver's brake operation is oriented in an acceleration direction and, the vehicle's motion induced by the control command is oriented in a deceleration direction.

6. The vehicle motion control system according to claim 1, wherein the control command value calculation unit estimates longitudinal jerk using vehicle lateral jerk.

7. The vehicle motion control system according to claim 1, wherein the processor further:

calculates an absolute value of the difference between the longitudinal acceleration and the control command value, and selectively corrects the control command when the longitudinal jerk is zero, or is greater than or equal to a predetermined positive value, and the absolute value of the difference between the longitudinal acceleration and the control command value is less than or equal to a predetermined value.

8. The vehicle motion control system according to claim 7, wherein the vehicle's motion induced by the driver's brake operation is oriented in an acceleration direction, and the vehicle's motion induced by the control command is oriented in a deceleration direction.

9. The vehicle motion control system according to claim 7, wherein the control command value calculation unit estimates longitudinal jerk using vehicle lateral jerk.

10. The vehicle motion control system according to claim 1, wherein the processor selectively corrects the control command when the longitudinal jerk is zero, or is greater than or equal to a predetermined positive value, and the control command value is a negative value.

11. The vehicle motion control system according to claim 10, wherein the control command value calculation unit estimates longitudinal jerk using vehicle lateral jerk.

12. The vehicle motion control system according to claim 1, wherein the processor calculates the control command value based on the location measured by the global position system.

13. The vehicle motion control system according to claim 1, wherein the processor calculates the control command value based on the value measured by the acceleration sensor.

14. The vehicle motion control system according to claim 1, wherein the processor calculates the control command value based on the fluid pressure in the master cylinder of the vehicle.

* * * * *